(12) United States Patent
Someya

(10) Patent No.: US 11,463,298 B2
(45) Date of Patent: Oct. 4, 2022

(54) MEDIATING APPARATUS, DEVICE MANAGEMENT SYSTEM, COMMUNICATION CONTROL METHOD, AND NON-TRANSITORY RECORDING MEDIUM

(71) Applicant: Yohsuke Someya, Kanagawa (JP)

(72) Inventor: Yohsuke Someya, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 17/393,406

(22) Filed: Aug. 4, 2021

(65) Prior Publication Data

US 2022/0070048 A1    Mar. 3, 2022

(30) Foreign Application Priority Data

Sep. 2, 2020 (JP) .............................. JP2020-147198

(51) Int. Cl.

| | |
|---|---|
| *G06F 15/16* | (2006.01) |
| *H04L 41/04* | (2022.01) |
| *H04L 41/22* | (2022.01) |
| *H04L 41/0695* | (2022.01) |
| *H04L 43/0817* | (2022.01) |
| *H04L 41/0816* | (2022.01) |
| *H04L 41/0668* | (2022.01) |
| *G06F 3/0482* | (2013.01) |

(52) U.S. Cl.
CPC .......... *H04L 41/04* (2013.01); *H04L 41/0668* (2013.01); *H04L 41/0695* (2013.01); *H04L 41/0816* (2013.01); *H04L 41/22* (2013.01); *H04L 43/0817* (2013.01); *G06F 3/0482* (2013.01)

(58) Field of Classification Search
CPC . H04L 41/04; H04L 41/0668; H04L 41/0695; H04L 41/0816; H04L 41/22; H04L 43/0817; G06F 3/0482
USPC .................................................. 709/224, 231
See application file for complete search history.

(56) References Cited

U.S. PATENT DOCUMENTS

| | | | |
|---|---|---|---|
| 10,735,220 B2* | 8/2020 | Cook | H04L 67/12 |
| 10,735,614 B2* | 8/2020 | Han | H04N 1/00344 |
| 2006/0038660 A1* | 2/2006 | Doumuki | H04B 3/542 |
| | | | 380/42 |
| 2019/0034127 A1* | 1/2019 | Chhabra | G06F 11/3006 |
| 2019/0391716 A1* | 12/2019 | Badr | G06V 20/20 |

(Continued)

FOREIGN PATENT DOCUMENTS

JP    2013-025693    2/2013

*Primary Examiner* — Karen C Tang
(74) *Attorney, Agent, or Firm* — Xsensus LLP

(57) ABSTRACT

A mediating apparatus, a device management system, a communication control method, and a non-transitory recording medium. The mediating apparatus displays on a display, a screen presenting communication connection status of the communication of the one or more devices, receives selection of a device to be registered in the mediating apparatus, among the one or more devices displayed on the screen presenting the communication connection status, receives a registration request to register the device in the mediating apparatus, and in response to the registration request, connect communication between the mediating apparatus and the device, after disconnection of communication between the remote management system and the device.

12 Claims, 25 Drawing Sheets

(56) References Cited

U.S. PATENT DOCUMENTS

| | | | |
|---|---|---|---|
| 2020/0137166 A1* | 4/2020 | Aoki | H04L 41/12 |
| 2020/0382367 A1* | 12/2020 | Rankin | H04L 41/0806 |
| 2021/0044491 A1* | 2/2021 | Shah | H04L 67/1095 |
| 2021/0173532 A1* | 6/2021 | Van der Keere | H04L 65/60 |
| 2021/0181699 A1* | 6/2021 | Rice | G06F 21/44 |
| 2021/0226866 A1* | 7/2021 | Vegas | H04L 41/22 |
| 2021/0326094 A1* | 10/2021 | Buerli | G06T 7/70 |
| 2021/0336860 A1* | 10/2021 | Van Gheluwe | H04L 41/0869 |
| 2021/0400116 A1* | 12/2021 | Bugenhagen | H04L 41/18 |

* cited by examiner

FIG. 4A

| DEVICE ID | DEVICE NAME | MAC ADDRESS | IP ADDRESS | MEDIATING APPARATUS ID | CONNECTION STATUS |
|---|---|---|---|---|---|
| device0001 | DEVICE A | XX.XX.AA.AA | 192.168.0.xxa | gw000001 | CONNECTED |
| device0002 | DEVICE B | YY.YY.BB.BB | 192.168.0.yyb | gw000002 | CONNECTED |
| device0003 | DEVICE C | RR.RR.CC.CC | 192.168.0.rrc | — | CONNECTED |
| ... | | | | | ... |

FIG. 4B

| MEDIATING APPARATUS ID | MEDIATING APPARATUS NUMBER | MAC ADDRESS | IP ADDRESS | CONNECTION STATUS |
|---|---|---|---|---|
| gw000001 | 001 | XX.XX.XX.XX | 192.168.0.xxx | NORMAL |
| gw000002 | 002 | YY.YY.YY.YY | 192.168.0.yyy | NORMAL |
| gw000003 | 003 | ZZ.ZZ.ZZ.ZZ | 192.168.0.zzz | FAILURE |
| ... | | | | ... |

FIG. 6A

| DEVICE ID | DEVICE NAME | MAC ADDRESS | IP ADDRESS | CONNECTION STATUS |
|---|---|---|---|---|
| device0001 | DEVICE A | XX.XX.AA.AA | 192.168.0.xxa | CONNECTED |
| device0005 | DEVICE E | XX.XX.AA.AE | 192.168.0.xxe | CONNECTED |
| device0007 | DEVICE G | XX.XX.AA.AG | 192.168.0.xxg | CONNECTED |
| ... | | | ... | |

FIG. 6B

| SYSTEM ID | SYSTEM NAME | URL | PASSWORD |
|---|---|---|---|
| remote001 | REMOTE MANAGEMENT SYSTEM A | device-management.aaaaa.com | kkkkk |

FIG. 7

| MEDIATING APPARATUS | REMOTE MANAGEMENT SYSTEM | | | | | |
|---|---|---|---|---|---|---|
| MEDIATING APPARATUS ID | SYSTEM ID | SYSTEM NAME | MAC ADDRESS | IP ADDRESS | CONNECTION STATUS | AUTHENTICATION INFORMATION |
| | MEDIATING APPARATUS NUMBER | | | IP ADDRESS | CONNECTION STATUS | AUTHENTICATION INFORMATION |
| gw000001 | 001 | | xx.xx.xx.xx | 192.168.0.xxx | CONNECTED | znmisgkuehjlqxypbvtra |

FIG. 9

MEDIATING APPARATUS INFORMATION

| | |
|---|---|
| REGISTRATION STATUS | NOT REGISTERED |
| REMOTE MANAGEMENT SYSTEM ADDRESS | — |
| MEDIATING APPARATUS NUMBER | — |
| IP ADDRESS | 192.168.0.rrr |
| MAC ADDRESS | RR.RR.RR.RR |

[ REGISTER IN REMOTE MANAGEMENT SYSTEM ] — 215

MEDIATING APPARATUS INFORMATION

LIST OF MANAGED DEVICES

| DEVICE NAME | CONNECTION STATUS | MEDIATING APPARATUS |
|---|---|---|
| DEVICE A | CONNECTED | MEDIATING APPARATUS A |
| DEVICE B | CONNECTED | MEDIATING APPARATUS B |
| DEVICE C | CONNECTED | — |
| DEVICE D | CONNECTED | — |
| DEVICE E | DISCONNECTED | MEDIATING APPARATUS A |
| ... | ... | ... |

- 301: LIST OF MEDIATING APPARATUSES
- 303: LIST OF MANAGED DEVICES
- 300

FIG. 12B

LIST OF MEDIATING APPARATUSES

| MEDIATING APPARATUS NAME | CONNECTION STATUS | |
|---|---|---|
| MEDIATING APPARATUS A | CONNECTED | ADD MANAGED DEVICE — 311a |
| MEDIATING APPARATUS C | DISCONNECTED | ADD MANAGED DEVICE — 311b |
| MEDIATING APPARATUS E | CONNECTED | ADD MANAGED DEVICE — 311c |
| ... | ... | ... |

- 301: LIST OF MEDIATING APPARATUSES
- 303: LIST OF MANAGED DEVICES
- 310

FIG. 13A

MANAGED DEVICE REGISTRATION

SELECT DEVICE TO BE MANAGED BY MEDIATING APPARATUS E

☐ SELECT ALL DEVICES

| | DEVICE NAME | CONNECTION STATUS |
|---|---|---|
| ☐ | DEVICE A | CONNECTED |
| ☐ | DEVICE B | CONNECTED |
| ■ | DEVICE C | CONNECTED |
| ... | ... | ... |

- 301 LIST OF MEDIATING APPARATUSES
- 303 LIST OF MANAGED DEVICES
- 331 ADD MANAGED DEVICE
- 333 DELETE MANAGED DEVICE
- 335 CANCEL
- 330

FIG. 13B

LIST OF MANAGED DEVICES

| DEVICE NAME | CONNECTION STATUS | MEDIATING APPARATUS |
|---|---|---|
| DEVICE A | CONNECTED | MEDIATING APPARATUS A |
| DEVICE B | CONNECTED | MEDIATING APPARATUS B |
| DEVICE C | CONNECTED | MEDIATING APPARATUS E |
| DEVICE D | CONNECTED | — |
| DEVICE E | DISCONNECTED | MEDIATING APPARATUS A |
| ... | ... | ... |

- 301 LIST OF MEDIATING APPARATUSES
- 303 LIST OF MANAGED DEVICES
- 350

FIG. 19

| DEVICE ID | DEVICE NAME | MAC ADDRESS | IP ADDRESS | MEDIATING APPARATUS ID | CONNECTION STATUS | MEDIATING APPARATUS USAGE STATUS |
|---|---|---|---|---|---|---|
| device0001 | DEVICE A | XX.XX.AA.AA | 192.168.0.xxa | gw000001 | CONNECTED | YES |
| device0002 | DEVICE B | YY.YY.BB.BB | 192.168.0.yyb | gw000002 | CONNECTED | YES |
| device0003 | DEVICE C | RR.RR.CC.CC | 192.168.0.rrb | gw000005 | DISCONNECTED | NO |
| ... | ... | ... | ... | ... | ... | ... |

MEDIATING APPARATUS, DEVICE MANAGEMENT SYSTEM, COMMUNICATION CONTROL METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2020-147198, filed on Sep. 2, 2020, in the Japan Patent Office, the entire disclosure of which is hereby incorporated by reference herein.

BACKGROUND

Technical Field

The present disclosure relates to a mediating apparatus, a device management system, a communication control method, and a non-transitory recording medium.

Related Art

A system that remotely manages devices residing in a local network such as a local area network (LAN) from outside the local network is known. In such a system, for example, a mediating apparatus capable of acquiring device information from the devices is provided in the local network. A remote management system located outside the local network implements remote management of the devices by performing communication with the mediating apparatus through a firewall.

Also, for the purpose of facilitating communication connection settings for managed devices, a technique in which the mediating apparatus acquires management information related to the devices managed by other mediating apparatuses and register as a device to be managed by the mediating apparatus itself is known.

SUMMARY

Embodiments of the present disclosure describe a mediating apparatus, a device management system, a communication control method, and a non-transitory recording medium. The mediating apparatus displays on a display, a screen presenting communication connection status of the communication of the one or more devices, receives selection of a device to be registered in the mediating apparatus, among the one or more devices displayed on the screen presenting the communication connection status, receives a registration request to register the device in the mediating apparatus, and in response to the registration request, connect communication between the mediating apparatus and the device, after disconnection of communication between the remote management system and the device.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4A is a conceptual diagram illustrating an example of a device information management table according to embodiments of the present disclosure;

FIG. 4B is a conceptual diagram illustrating an example of a mediating information management table according to embodiments of the present disclosure;

FIG. 6A is a conceptual diagram illustrating an example of a device information management table according to embodiments of the present disclosure;

FIG. 6B is a conceptual diagram illustrating an example of a system information management table according to embodiments of the present disclosure;

FIG. 7 is a conceptual diagram illustrating an example of a connection management table according to embodiments of the present disclosure;

FIG. 9 is a diagram illustrating an example of an initial setting screen displayed on the mediating apparatus according to embodiments of the present disclosure;

FIGS. 12A and 12B are diagrams illustrating examples of connection status display screens displayed on the mediating apparatus according to embodiments of the present disclosure;

FIGS. 13A and 13B are diagrams illustrating examples of the connection status display screens displayed on the mediating apparatus according to embodiments of the present disclosure;

FIG. 19 is a conceptual diagram illustrating another example of the device information management table according to embodiments of the present disclosure;

Figure 1:
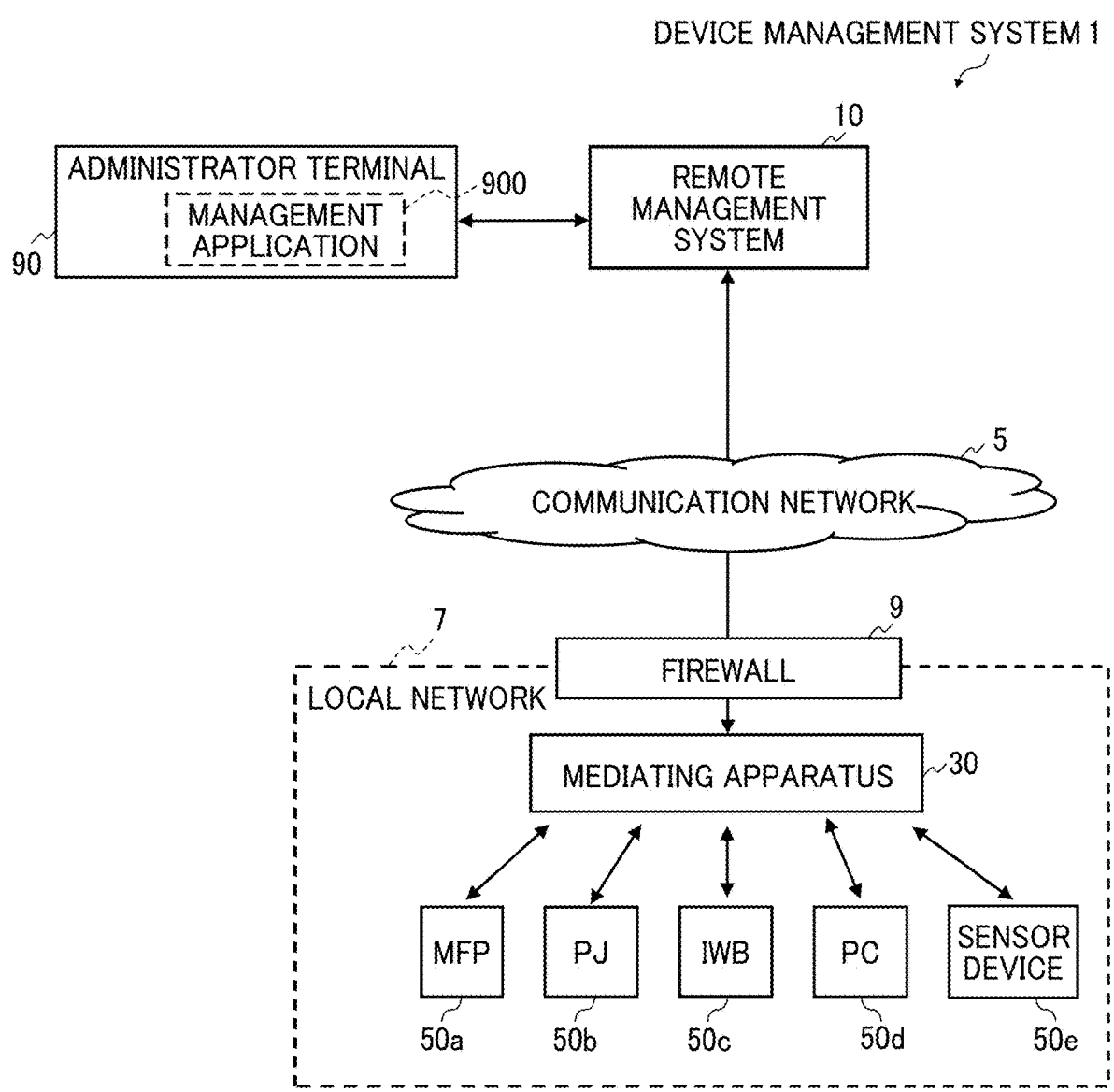
FIG. 1 is a block diagram illustrating an example of a device management system according to embodiments of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described with reference to the drawings. In the description of the drawings, same elements are denoted by the same reference numerals, and redundant description is omitted.

FIG. 1 is a block diagram illustrating an example of a device management system according to the present embodiment. A device management system 1 illustrated in FIG. 1 is a system that uses a remote management system 10 on the cloud to perform centralized remote management of devices 50 residing in remote locations.

The device management system 1 includes the remote management system 10, a local network 7, and a firewall 9. The local network 7 is connected to the remote management system 10 through the communication network 5. The local network 7 and the remote management system 10 are connected to each other through the firewall 9 as an interface. The communication network 5 is implemented by the internet, a mobile communication network, or the like. Note that the communication network 5 may include not only wired communication but also a part implemented by mobile communication network such as 3rd Generation (3G), 4th Generation (4G), 5th Generation (5G), and Long Term Evolution (LTE) and wireless communication such as Wireless Fidelity (WI-FI (registered trademark)) or Worldwide Interoperability for Microwave Access (WiMAX). Further, the communication network 5 may include a network implemented by a blockchain.

The local network 7 is a communication network formed in a network environment such as an office, a conference room, a warehouse, a factory, or a particular production line. The local network 7 is, for example, an in-house local area network (LAN) that does not pass through the internet. The local network 7 includes a mediating apparatus 30, a multifunction peripheral (MFP) 50a, a projector (PJ) 50b, an interactive whiteboard (IWB) 50c, a personal computer (PC) 50d, and a sensor device 50e (such as an electronic balance, a barometer, an accelerometer, an ammeter, a thermometer, a photometer, a motion sensor, a camera, and an illuminometer that can communicate with the outside). The MFP 50a, PJ 50b, IWB 50c, PC 50d, and sensor device 50e are management target devices that are targets of remote management in the device management system 1. The device 50 used in the following description is a general term for these management target devices.

The firewall 9 allows only a specific packet to pass from the remote management system 10 through the communication network 5 into the local network 7. This allows the firewall 9 to block unintended or unauthorized access to the local network 7. The firewall 9 transfers a packet from the mediating apparatus 30 to the remote management system 10.

The remote management system 10 is a server computer for managing information of the mediating apparatus 30 and the devices 50 residing in a plurality of local networks 7. The remote management system 10 is connected to the mediating apparatus 30 through the firewall 9, and remotely manages the devices 50 in the local network 7 through the mediating apparatus 30. As an example of management, the remote management system 10 can acquire information on a state such as the remaining amount of toner or the number of printed sheets from the MFP 50a. Further, the remote management system 10 can issue an instruction to print a document stored in the MFP 50a. Further, the remote management system 10 can turn on or turn off the PJ 50b, the IWB 50c, and the PC 50d. In addition, the remote management system 10 can acquire information acquired by the sensor devices 50e from the sensor devices 50e. The remote management system 10 may be implemented by a single computer or may be implemented by a plurality of computers to which each unit (function) of each device is divided and allocated.

The administrator terminal 90 is a terminal such as a notebook PC used by a device administrator who monitors the device 50 using the remote management system 10. The administrator terminal 90 displays device information of the device 50 managed by the remote management system 10 using a web browser or the like, thereby providing the device administrator with the information of the device 50 to be managed. In the administrator terminal 90, a management application 900 is installed for operation. The remote management system 10 sets content of the application to be provided to each administrator terminal 90 in accordance with, for example, use environment of the local network 7, type of the device 50, contract content, or the like, and manages the application to be provided for each administrator terminal 90.

The administrator terminal 90 is not limited to the notebook PC and may be a terminal such as a tablet terminal, a smartphone, a wearable terminal, or a desktop PC. In addition, the administrator terminal 90 may be configured to directly communicate with the mediating apparatus 30 or the device 50 in the local network 7. For example, in a case where an administrator or the like of the mediating apparatus 30 or the device 50 performs installation at a site, the administrator terminal 90 used by the administrator in charge of installation can smoothly perform the installation work by directly communicating with the mediating apparatus 30 or the device 50 in the local network 7.

The mediating apparatus 30 mediates communication between the remote management system 10 and the device 50 in the local network 7. The mediating apparatus 30 maintains a session at all times in order to transmit a message from the remote management system 10 through the firewall 9 into the local network 7, and implements bidirectional communication between the remote management system 10 and the monitoring target device 50 while ensuring security in the local network 7. The mediating apparatus 30 can communicate with the device 50 and the firewall 9 through a wired or wireless LAN or the like. The mediating apparatus 30 accesses the device 50 in response to an instruction from the remote management system 10, transmits an alert notice from the device 50 to the remote management system 10, and transmits information acquisition notice or performs monitoring of an operating state (for example, whether the device 50 is communicable) of the device 50 based on a schedule set in advance.

Since the device management system 1 can collectively transmit information of a plurality of devices 50 residing in the same local network 7 from the mediating apparatus 30 to the remote management system 10, a communication load can be reduced. In addition, since the device management system 1 is provided with the mediating apparatus 30, it is not necessary to perform network security settings such as access permission to the firewall 9 for each device 50, and thus it is possible to reduce a burden of a user associated with setting of the device 50. The mediating apparatus 30 may be a box-type communication device that functions as a single unit or may be built in a device such as the MFP 50a.

The mediating apparatus 30 can communicate with the remote management system 10 on the communication network 5 through the firewall 9. The mediating apparatus 30 is located inside the firewall 9 (inside the local network 7 having the firewall 9 as an interface) and the remote management system 10 is located outside the firewall 9 (inside the local network 7 having the firewall 9 as an interface).

The devices 50 (MFP 50a, PJ 50b, IWB 50c, PC 50d and sensor devices 50e) are located in the local network 7 and are located inside (the local network 7 interfaced with) the firewall. The device 50 is a device to be managed by the remote management system 10 for maintenance, meter reading, and the like performed by the remote management system 10. Note that the device 50 is not limited to one of the examples illustrated in FIG. 1 (MFP 50a, PJ 50b, IWB 50c, PC 50d, and sensor device 50e), and may be, for example, industrial machines such as processing apparatuses, examination apparatuses, transport apparatuses, or picking apparatuses, medical devices such as fundus examination apparatuses, X-ray examination apparatuses, blood pressure meters, body fat meters, visual acuity meters, or pacemakers, three-dimensional (3D) printers, imaging device, or the like. The device 50 may be an automatic vending machine, a power supply device, an air conditioning system, a metering system for gas, water, electricity, or the like, an autonomous traveling robot, or the like. In addition, the device 50 may be a terminal having no communication function such as a motion sensor, attached to a device having communication function.

FIG. 1 illustrates an example in which the remote management system 10 remotely manages a plurality of devices 50 located in one local network 7, but the remote management system 10 may be configured to remotely manage the devices 50 located in each of the plurality of local networks 7. Also, FIG. 1 illustrates an example in which one mediating apparatus 30 is located in one local network 7, but a plurality of mediating apparatuses 30 may be located in one local network 7. In this case, the plurality of mediating apparatuses 30 may share the function of each mediating apparatus 30.

Figure 2:
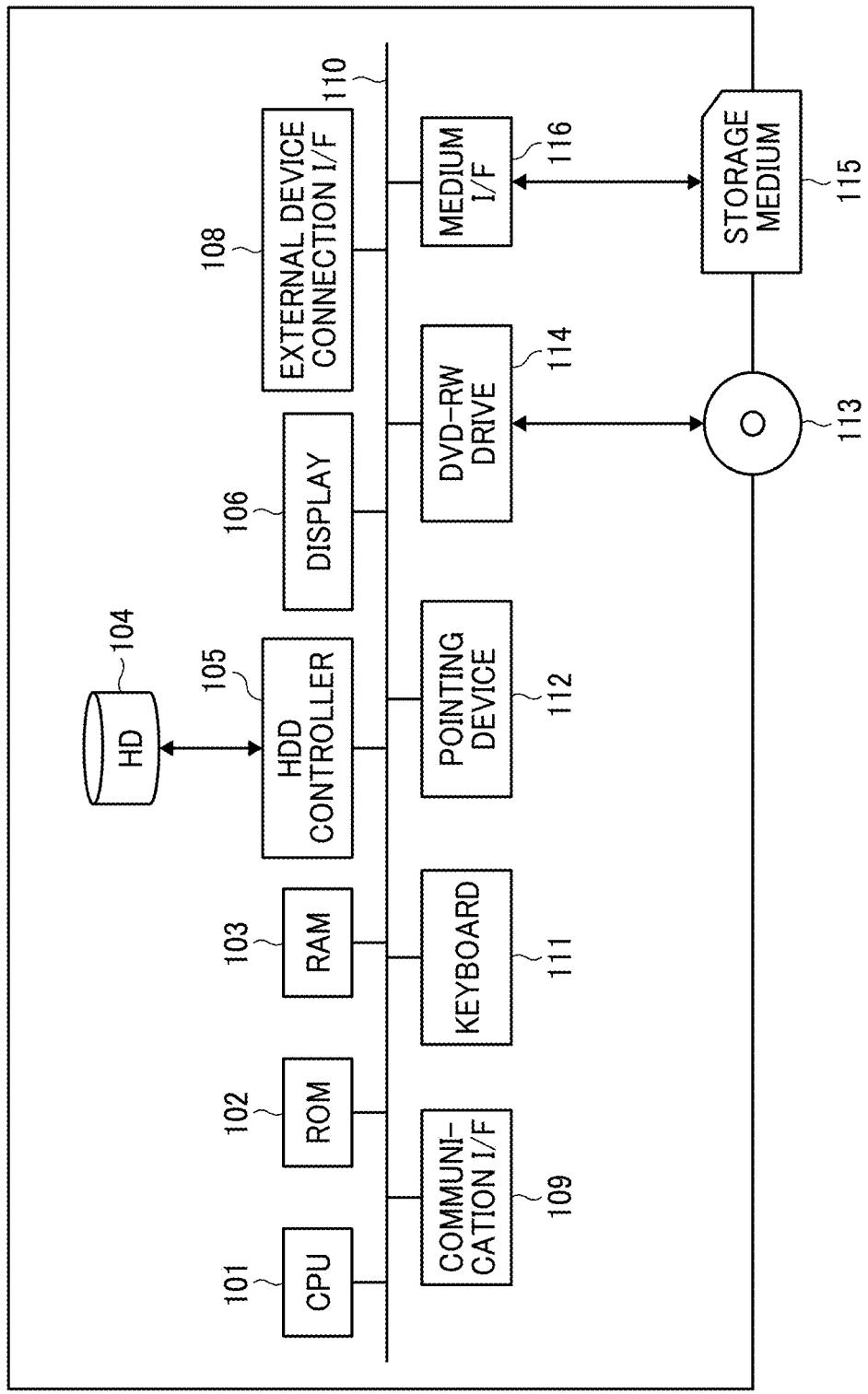
FIG. 2 is a block diagram illustrating an example of a hardware configuration of a computer according to embodiments of the present disclosure.

With reference to FIG. 2, a hardware configuration of an apparatus or a terminal included in the device management system according to the present embodiment is described. The devices or terminals included in the device management system 1 have a configuration of a general computer. Here, an example of hardware configuration of the general computer is described.

FIG. 2 is a block diagram illustrating an example of the hardware configuration of the computer according to the present embodiment. In the hardware configuration of the computer illustrated in FIG. 2, components or elements may be added or deleted as needed. The computer includes a central processing unit (CPU) 101, a read only memory (ROM) 102, a random access memory (RAM) 103, a hard disk (HD) 104, a hard disk drive (HDD) controller 105, a display 106, an external device connection interface (I/F) 108, a communication I/F 109, a bus line 110, a keyboard 111, a pointing device 112, a digital versatile disc rewritable (DVD-RW) drive 114, and a medium I/F 116.

Among these elements, the CPU 101 controls all operations of the computer. The ROM 102 stores a program used for driving the CPU 101, such as an initial program loader (IPL). The RAM 103 is used as a work area of the CPU 101. The HD 104 stores various data such as a control program. The HDD controller 105 controls reading or writing of various data to the HD 104 under the control of the CPU 101. The display 106 displays various information such as a cursor, menu, window, characters, or image. In one example, the display 106 is a touch panel display provided with an input device. The external device connection I/F 108 is an interface that connects the computer to various external devices. The communication I/F 109 is an interface for data transmission and reception with other computers or electronic devices. The communication I/F 109 is, for example, a communication interface such as a wired or wireless LAN. The communication I/F 109 may include a communication interface for mobile communication such as third generation (3G), fourth generation (4G), fifth generation (5G), or Long Term Evolution (LTE), WI-FI (registered trademark), Worldwide Interoperability for Microwave Access (WiMAX), or the like. The bus line 110 is, for example, an address bus or a data bus, which electrically connects the elements such as the CPU 101 illustrated in FIG. 2.

The keyboard 111 is one example of an input device provided with a plurality of keys for enabling a user to input characters, numerals, or various instructions. The pointing device 112 is an example of an input device that allows a user to select or execute a specific instruction, select a target for processing, or move a cursor being displayed. The input device is not limited to the keyboard 111 and the pointing device 112, and may be a touch panel, a voice input device, or the like. The DVD-RW drive 114 reads and writes various data from and to a DVD-RW 113, which is an example of a removable storage medium. The removable storage medium is not limited to the DVD-RW and may be a digital versatile disk-recordable (DVD-R), a BLU-RAY (registered trademark) disc, or the like. The medium I/F 116 controls reading or writing (storing) of data with respect to a storage medium 115 such as a flash memory.

In the hardware configuration according to the present embodiment, components or elements may be added or deleted as needed. For example, the remote management system 10 may not include the input device such as the keyboard 111 and the display 106. The device 50 may include a module or the like for providing a function or a service corresponding to type of each device.

Further, any one of the above-described control programs may be recorded in a file in a format installable or executable on a computer-readable storage medium for distribution. Examples of the storage medium include, but not limited to, Compact Disc Recordable (CD-R), Digital Versatile Disc (DVD), BLU-RAY (registered trademark) disc, Secure Digital (SD) card, Universal Serial Bus (USB) memory, and the like. In addition, such storage medium may be provided in the form of a program product to users within a certain country or outside that country. For example, the device management system 1 implements the device management method according to the present disclosure by executing the program according to the present disclosure.

Figure 3:
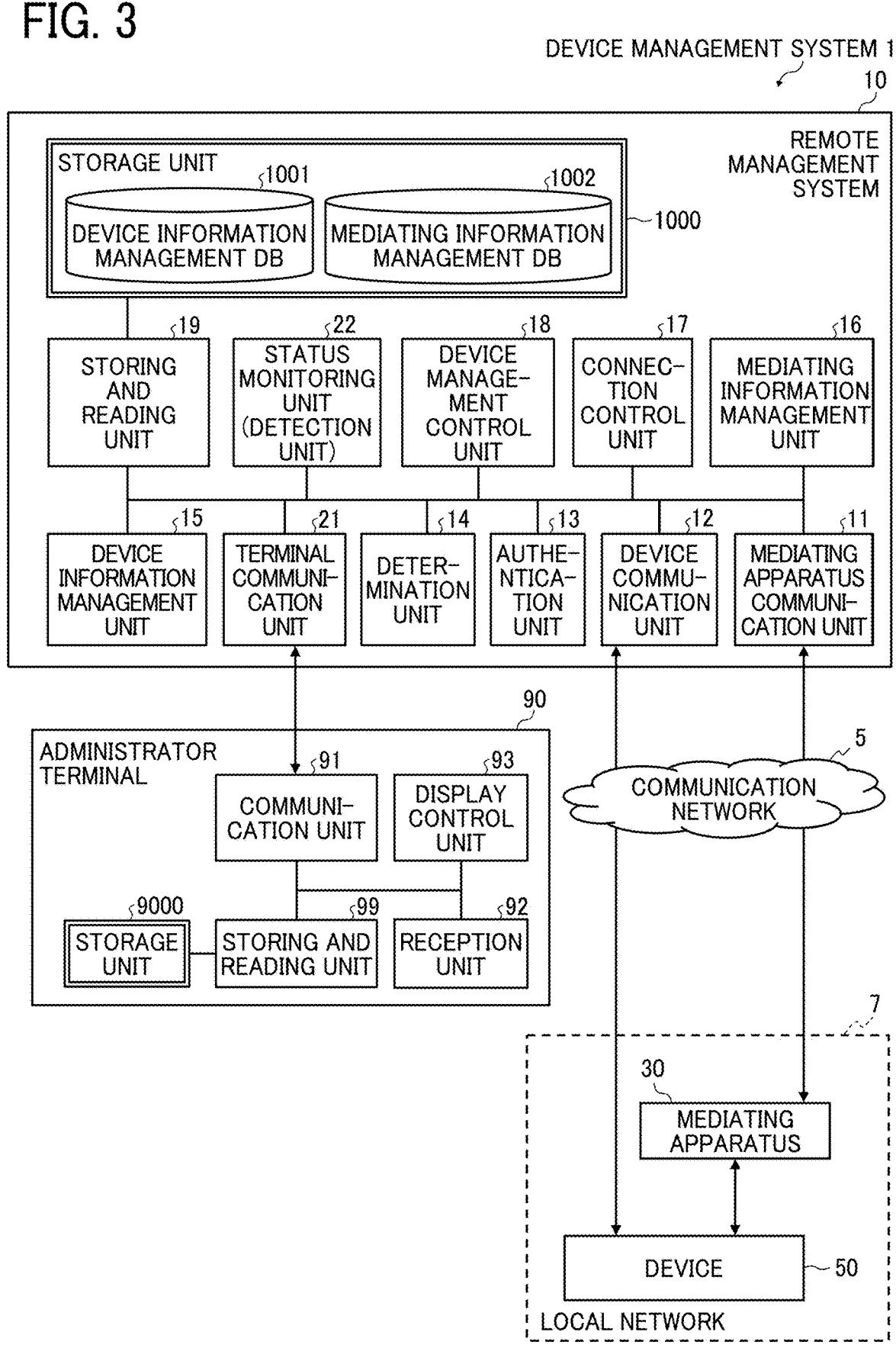
FIG. 3 is a block diagram illustrating an example of a functional configuration of a remote management system and an administrator terminal according to embodiments of the present disclosure.
Figure 5:
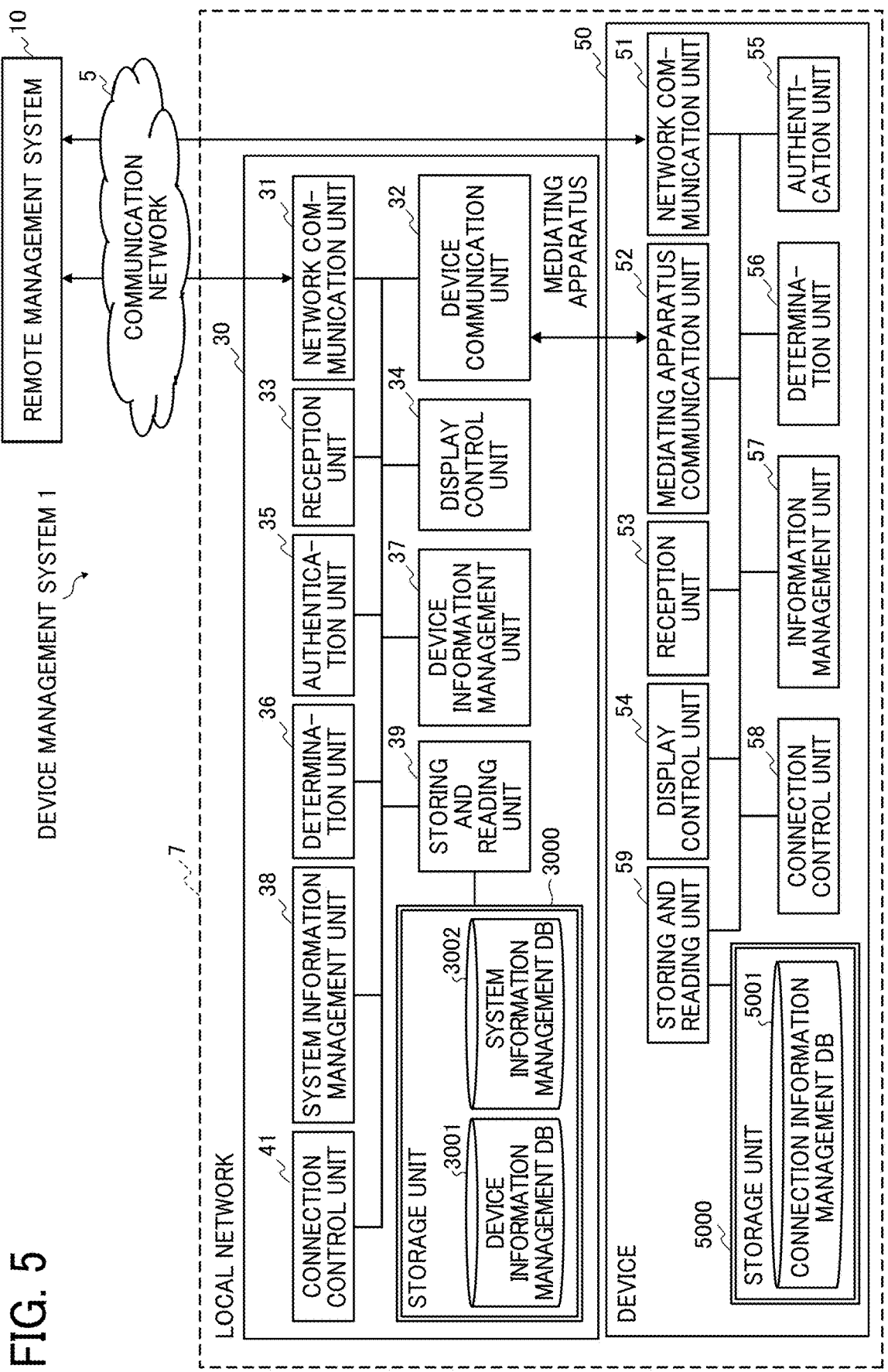
FIG. 5 is a block diagram illustrating an example of a functional configuration of a mediating apparatus and a device according to embodiments of the present disclosure.

A functional configuration of the device management system according to the present embodiment is described with reference to FIGS. 3 to 7. FIG. 3 and FIG. 5 illustrate processes or operations related to below description. With reference to FIGS. 3 and 4, the functional configuration of the remote management system 10 and the administrator terminal 90 is described. FIG. 3 is a block diagram illustrating an example of the functional configuration of the remote management system and the administrator terminal according to the present embodiment.

The remote management system 10 includes a mediating apparatus communication unit 11, a device communication unit 12, an authentication unit 13, a determination unit 14, a device information management unit 15, a mediating information management unit 16, a connection control unit 17, a device management control unit 18, a terminal communication unit 21, a status monitoring unit 22, and a storing and reading unit 19. These units are functions implemented by or caused to function by operating any of the elements illustrated in FIG. 2 in cooperation with the instructions of the CPU 101 according to the device management apparatus program expanded to the RAM 103. In addition, the remote management system 10 includes a storage unit 1000 implemented by the ROM 102, the HD 104, or the storage medium 115 illustrated in FIG. 2.

The mediating apparatus communication unit 11 is mainly implemented by processing of CPU 101 and the communication I/F 109, and communication of various data or information is performed with the mediating apparatus 30. The mediating apparatus communication unit 11 controls communication with the mediating apparatus 30 residing inside the local network 7 through the firewall 9. The mediating apparatus communication unit 11 receives polling transmitted from the mediating apparatus 30 to the remote management system 10 and transmits a response to the polling to the mediating apparatus 30. Alternatively, the mediating apparatus communication unit 11 may maintain a communication session (such as Web Socket or Message Queuing Telemetry Transport (MQTT)) so that the mediating apparatus 30 can always communicate with the remote management system 10, and transmits and receive various data or information to and from the mediating apparatus 30. In the present embodiment, either method may be adopted.

The mediating apparatus communication unit 11 transmits, for example, a command indicating a predetermined request to the device 50 received by the administrator terminal 90 to the mediating apparatus 30. In a case where the communication session is not a communication session (such as the Web Socket or MQTT) in which the mediating apparatus 30 can always communicate with the remote management system 10, the remote management system 10 manages a transmission state of the command received by the administrator terminal 90 in a status such as non-transmission or transmission completed. The mediating apparatus communication unit 11 receives, from the mediating apparatus 30, the device information such as a response to the command transmitted to the mediating apparatus 30 or status information of the device 50 voluntarily transmitted from the device 50.

The device communication unit 12 is mainly implemented by the processing of CPU 101 and the communication I/F 109 and performs communication of various kinds of information with the device 50. The authentication unit 13 is implemented by processing of CPU 101 and executes authentication process for the mediating apparatus 30 or the device 50 connected to the remote management system 10. The determination unit 14 is implemented by the processing of CPU 101 and executes various determinations.

The device information management unit 15 is implemented by the processing of CPU 101 and manages the device information of the management target device 50. The device information management unit 15 serves as, for example, a registration unit, and registers the device information related to the device 50 in a device information management database (DB) 1001 based on a request from the device 50 or the mediating apparatus 30. The mediating information management unit 16 is implemented by the processing of CPU 101 and manages mediating information for mediating communication with the management target device 50. The mediating information management unit 16 serves as, for example, a registration unit, and registers the mediating information related to the mediating apparatus 30 in the mediating information management DB 1002 based on a request from the mediating apparatus 30.

The connection control unit 17 is mainly implemented by the processing of CPU 101 and controls a connection status of communication with the device 50. The connection control unit 17 executes connection or disconnection process of communication with the device 50 in response to, for example, a request from the device 50 or the mediating apparatus 30.

The device management control unit 18 is implemented by the processing of CPU 101 and controls a device management process by the device administrator such as registration of a management target device 50 or connection setting of communication of the device 50. The device management control unit 18 provides, for example, the mediating apparatus 30 or the administrator terminal 90 with a device management user interface for changing the network configuration of the device management system 1.

The terminal communication unit 21 is mainly implemented by the processing of CPU 101 and the communication I/F 109 and performs communication of various kinds of information with the administrator terminal 90. The terminal communication unit 21 functions as, for example, a server unit of a web application and receives a request from the administrator terminal 90 by a WebAPI (Web Application Programming Interface) using a communication protocol such as HyperText Transfer Protocol Secure (HTTPS), executes processing according to the request, and transmits the result to the administrator terminal 90. The communication protocol to be used is not limited to HTTPS, and a protocol such as File Transfer Protocol (FTP), HyperText Transfer Protocol (HTTP), or Simple Network Management Protocol (SNMP) may be used. In addition, the terminal communication unit 21 issues (generates) a command to be transmitted to the mediating apparatus 30 or the device 50 when communication with the mediating apparatus 30 or the device 50 is necessary from the remote management system 10. The issued command is, for example, a control instruction such as acquisition of status information of the device 50 or turn on or turn off of the power supply. The terminal communication unit 21 may have a function of maintaining a constant connection status such as WebSocket or MQTT in order to notify a result of the command received by the mediating apparatus communication unit 11 on a screen of the administrator terminal 90 in real time. The remote management system 10 provides a secure communication path between the management application 900 and the device 50 through the terminal communication unit 21.

The status monitoring unit 22 is mainly implemented by the processing of CPU 101 and executes life-and-death monitoring of the mediating apparatus 30. For example, the status monitoring unit 22 detects a malfunction of the mediating apparatus 30 in accordance with status information indicating the status of the mediating apparatus 30.

The storing and reading unit 19 is mainly implemented by the processing of CPU 101 and stores various types of information in the storage unit 1000 or reads various types of information from the storage unit 1000.

FIG. 4A is a conceptual diagram illustrating an example of a device information management table according to the present embodiment. The device information management table is a table for managing various types of information regarding the device 50 to be managed by the remote management system 10. In the storage unit 1000, a device information management DB 1001 storing a device information management table as illustrated in FIG. 4A is implemented.

The device information management table stores the device information in which a device ID and a device name for identifying the device 50, a media access control (MAC) address and an internet protocol (IP) address for indicating a destination of the device 50, a mediating apparatus ID for identifying the mediating apparatus 30 that controls the device 50, and connection status information indicating a connection status with the mediating apparatus 30 or the remote management system 10 associated with each other. The device ID is, for example, a model name or a serial number of the device 50. At least one of the MAC address and the IP address is an example of destination information indicating a destination of the device 50. Furthermore, a device 50 having the mediating apparatus ID assigned and connection status "connected" is connected to the mediating apparatus 30 corresponding to the mediating apparatus ID. On the other hand, a device 50 having mediating apparatus ID blank ("-") and connection status "connected" indicates that the device 50 is connected to the remote management system 10. The mediating apparatus ID and the connection status information indicated in the device information are an example of connection destination information indicating a connection destination of the device 50.

FIG. 4B is a conceptual diagram illustrating an example of a mediating information management table according to the present embodiment. The mediating information management table is a table for managing various types of information related to the mediating apparatus 30 that can communicate with the remote management system 10 through the firewall 9. In the storage unit 1000, a mediating information management DB 1002 storing the mediating information management table as illustrated in FIG. 4B is implemented.

The mediating information management table includes the mediating information in which a mediating apparatus ID and a mediating apparatus number for identifying the mediating apparatus 30, a MAC address and an IP address indicating a destination of the mediating apparatus 30, and status information indicating a status of the mediating apparatus 30 are associated with each other. At least one of the MAC address and the IP address is an example of destination information indicating a destination of the mediating apparatus 30. The status information indicates the operating status of the mediating apparatus 30. The status information indicates "normal" when the mediating apparatus 30 operates normally and indicates "failure" when a malfunction occurs.

Referring back to FIG. 3, the administrator terminal 90 includes a communication unit 91, a reception unit 92, a display control unit 93, and a storing and reading unit 99. Each of these units is a function implemented by operating any one of the components illustrated in FIG. 2 in response to an instruction from the CPU 101 according to the administrator terminal program developed on the RAM 103. The administrator terminal 90 includes a storage unit 9000 implemented by the ROM 102, the HD 104, or the storage medium 115 illustrated in FIG. 2.

The communication unit 91 is mainly implemented by the processing of CPU 101 and the communication I/F 109 and executes communication of various kinds of information with the remote management system 10 using the management application 900. The communication unit 91, for example, operates as a client unit of a web application and is implemented by executing a program described in a language such as HyperText Markup Language (HTML), JAVASCRIPT (registered trademark), or Cascading Style Sheets (CSS) that operates in a web browser.

The reception unit 92 is implemented mainly by the processing of CPU 101 and the keyboard 111 or the pointing devices 112 and receives various selections or inputs from users. The display control unit 93 is implemented mainly by the processing of CPU 101 and causes the display 106 to display various images.

The storing and reading unit 99 is mainly implemented by the processing of CPU 101 and stores various types of information in the storage unit 9000 or reads various types of information from the storage unit 9000.

With reference to FIGS. 5 to 7, a functional configuration of each device residing on the local network 7 is described. FIG. 5 is a block diagram illustrating an example of a functional configuration of the mediating apparatus and the device according to the present embodiment.

The mediating apparatus 30 includes a network communication unit 31, a device communication unit 32, a reception unit 33, a display control unit 34, an authentication unit 35, a determination unit 36, a device information management unit 37, a system information management unit 38, a connection control unit 41, and a storing and reading unit 39. These units are functions implemented by operating any of the constituent elements illustrated in FIG. 2 in response to an instruction from the CPU 101 according to the mediating apparatus program developed on the RAM 103. The mediating apparatus 30 includes a storage unit 3000 implemented by the ROM 102, the HD 104, or the storage medium 115 illustrated in FIG. 2.

The network communication unit 31 is mainly implemented by the processing of CPU 101 and the communication I/F 109 and executes communication of various kinds of information with the remote management system 10. For example, the network communication unit 31 transmits, to the remote management system 10, a device registration request indicating a request for registration of the device 50 to be connected to the mediating apparatus 30. The device communication unit 32 is mainly implemented by the processing of CPU 101 and the communication I/F 109 and performs communication of various kinds of information with the device 50.

The reception unit 33 is implemented mainly by the processing of CPU 101 and the keyboard 111 or the pointing devices 112 and receives various selections or inputs from users. The display control unit 34 is implemented mainly by the processing of CPU 101 and causes the display 106 to display various images. The authentication unit 35 is implemented by processing of CPU 101 and executes an authentication process for the mediating apparatus 30 or the device 50 connected to the remote management system 10. The determination unit 36 is implemented by the processing of CPU 101 and executes various determinations.

The device information management unit 37 is implemented by the processing of CPU 101 and manages the device information related to the device 50 capable of communicating with the mediating apparatus 30. The system information management unit 38 is implemented by the processing of CPU 101 and manages system information related to the remote management system 10 capable of communicating with the mediating apparatus 30.

The connection control unit 41 is mainly implemented by the processing of CPU 101 and controls a connection status of communication with the device 50. The connection control unit 41 connects or disconnects communication with the device 50 in response to a request from the device 50 or the remote management system 10, for example.

The storing and reading unit 39 is mainly implemented by the processing of CPU 101 and stores various types of information in the storage unit 3000 or reads various types of information from the storage unit 3000.

FIG. 6A is a conceptual diagram illustrating an example of a device information management table according to the present embodiment. The device information management table is a table for managing various types of information related to the devices 50 that are communicably connected to the mediating apparatus 30 and are management targets of the remote management system 10. In the storage unit 3000, a device information management DB 3001 storing a device information management table as illustrated in FIG. 6A is implemented.

The device information management table stores the device information in which a device ID and a device name for identifying the device 50, a media access control (MAC) address and an internet protocol (IP) address indicating a destination of the device 50, and connection status information indicating a connection status with the device 50 are associated with each other. The device ID is, for example, a model name or a serial number of the device 50. At least one of the MAC address and the IP address is an example of destination information indicating a destination of the device 50. Further, the connection status information indicates "connected" when the device 50 is connected and indicates "disconnected" when the device 50 is not connected.

FIG. 6B is a conceptual diagram illustrating an example of a system information management table according to the present embodiment. The system information management table is a table for managing various types of information related to the remote management system 10 capable of communicating with the mediating apparatus 30 through the firewall 9. In the storage unit 3000, a system information management DB 3002 storing a system information management table as illustrated in FIG. 6B is implemented.

The system information management table stores system information in which a system ID and a system name for identifying the remote management system 10, a uniform resource locator (URL) indicating a destination of the remote management system 10, and a password for performing authentication to the remote management system 10 are associated with each other. The URL is an example of destination information indicating a destination of the remote management system 10.

Returning to FIG. 5, the device 50 includes a network communication unit 51, a mediating apparatus communication unit 52, a reception unit 53, a display control unit 54, an authentication unit 55, a determination unit 56, an information management unit 57, a connection control unit 58, and a storing and reading unit 59. These units are functions implemented by or caused to function by operating any of the elements illustrated in FIG. 2 in cooperation with the instructions of the CPU 101 according to a device program developed in the RAM 103. The device 50 includes a storage unit 5000 implemented by the ROM 102, the HD 104, or the storage medium 115 illustrated in FIG. 2.

The network communication unit 51 is mainly implemented by the processing of CPU 101 and the communication I/F 109 and executes communication of various kinds of information with the remote management system 10. The mediating apparatus communication unit 52 is mainly implemented by the processing of CPU 101 and the communication I/F 109, and communication of various data or information is performed with the mediating apparatus 30. The mediating apparatus communication unit 52 communicates with the mediating apparatus 30 using a communication protocol such as the HTTP or SNMP. The mediating apparatus communication unit 52 may perform serial communication.

The reception unit 53 is implemented mainly by the processing of CPU 101 and the keyboard 111 or the pointing devices 112 and receives various selections or inputs from users. The display control unit 54 is implemented mainly by the processing of CPU 101 and causes the display 106 to display various images. The authentication unit 55 is implemented by the processing of CPU 101 and executes authentication process for the mediating apparatus 30 or the remote management system 10 that the device 50 connects to. The determination unit 56 is implemented by the processing of CPU 101 and executes various determinations.

The information management unit 57 is implemented by the processing of CPU 101 and manages various types of information related to the device 50. The connection control unit 58 is mainly implemented by processing of the CPU 101 and controls connection of communication with the mediating apparatus 30 or the remote management system 10. For example, in response to a request from the remote management system 10 or the mediating apparatus 30, the connection control unit 58 executes a process of connecting or disconnecting communication with the remote management system 10 or the mediating apparatus 30.

The storing and reading unit 59 is mainly implemented by the processing of CPU 101 and stores various types of information in the storage unit 5000 or reads various types of information from the storage unit 5000. The storage unit 5000 stores device information of the device 50.

FIG. 7 is a conceptual diagram illustrating an example of a connection management table according to the present embodiment. The connection information management table stores the connection information indicating a connection status with the remote management system 10 or the mediating apparatus 30. In the storage unit 5000, a connection information management DB 5001 storing a connection information management table as illustrated in FIG. 7 is implemented.

The connection information management table indicates connection information between the device 50 and the remote management system 10 or to the mediating apparatus 30. When the device 50 is connected to the mediating apparatus 30, the connection information management table indicates the connection information of the mediating apparatus 30. On the other hand, when the device 50 is connected to the remote management system 10, the connection information management table indicates connection information of the remote management system 10. The connection information of the mediating apparatus includes a mediating apparatus ID and a mediating apparatus number for identifying the mediating apparatus 30, a MAC address and an IP address indicating a destination of the mediating apparatus 30, a connection status with the mediating apparatus 30, and authentication information of the mediating apparatus 30. Further, the connection information of the remote management system 10 includes a system ID and a system name for identifying the remote management system 10, an IP address of the remote management system 10, a connection status with the remote management system 10, and authentication information of the remote management system 10.

Figure 8:
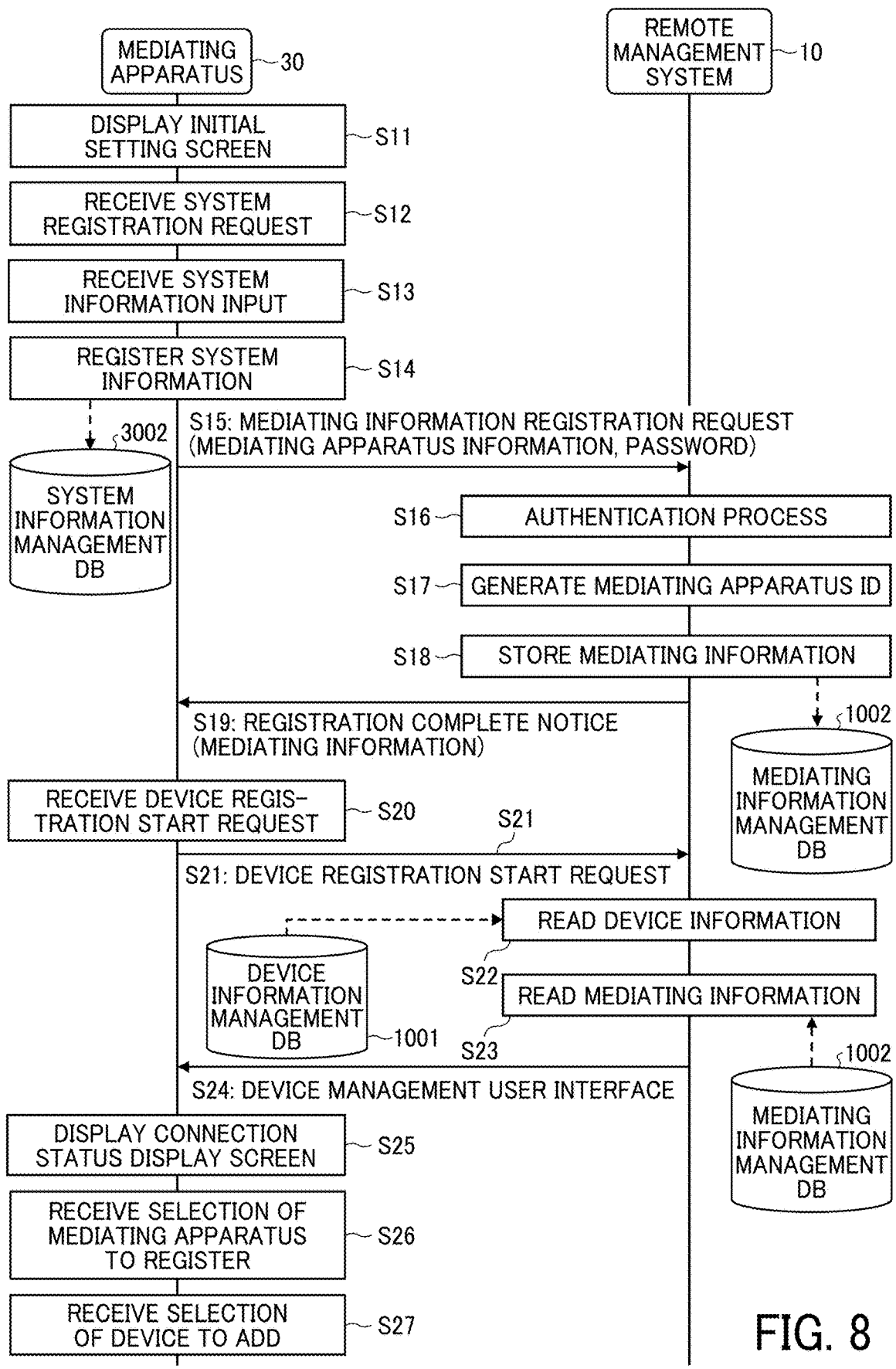
FIG. 8 is a sequence diagram illustrating an example of a connection process between a newly installed mediating apparatus and the device in the device management system according to embodiments of the present disclosure.
Figure 14:
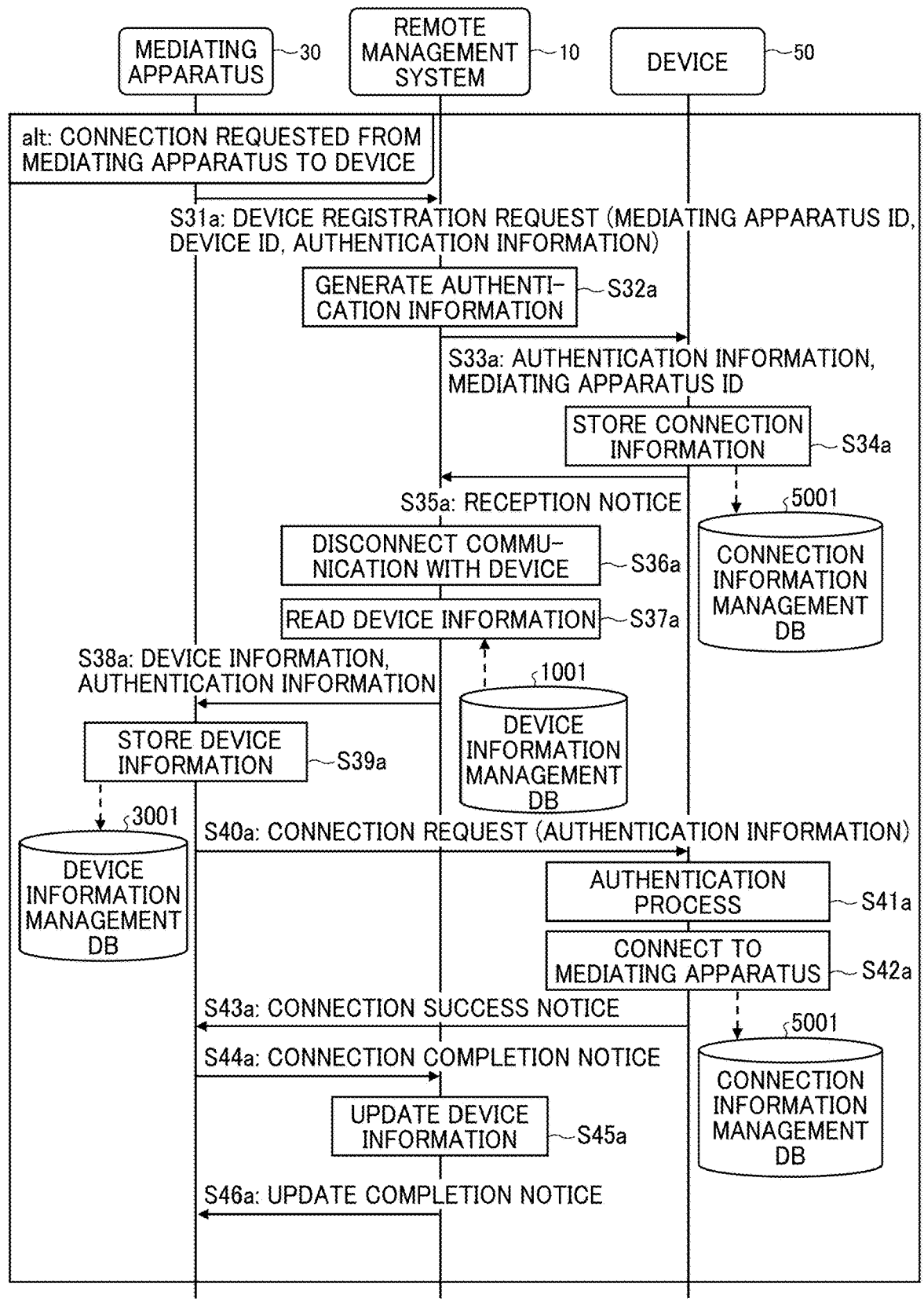
FIG. 14 is a sequence diagram illustrating an example of a connection process between the newly installed mediating apparatus and the device in the device management system according to embodiments of the present disclosure.
Figure 15:
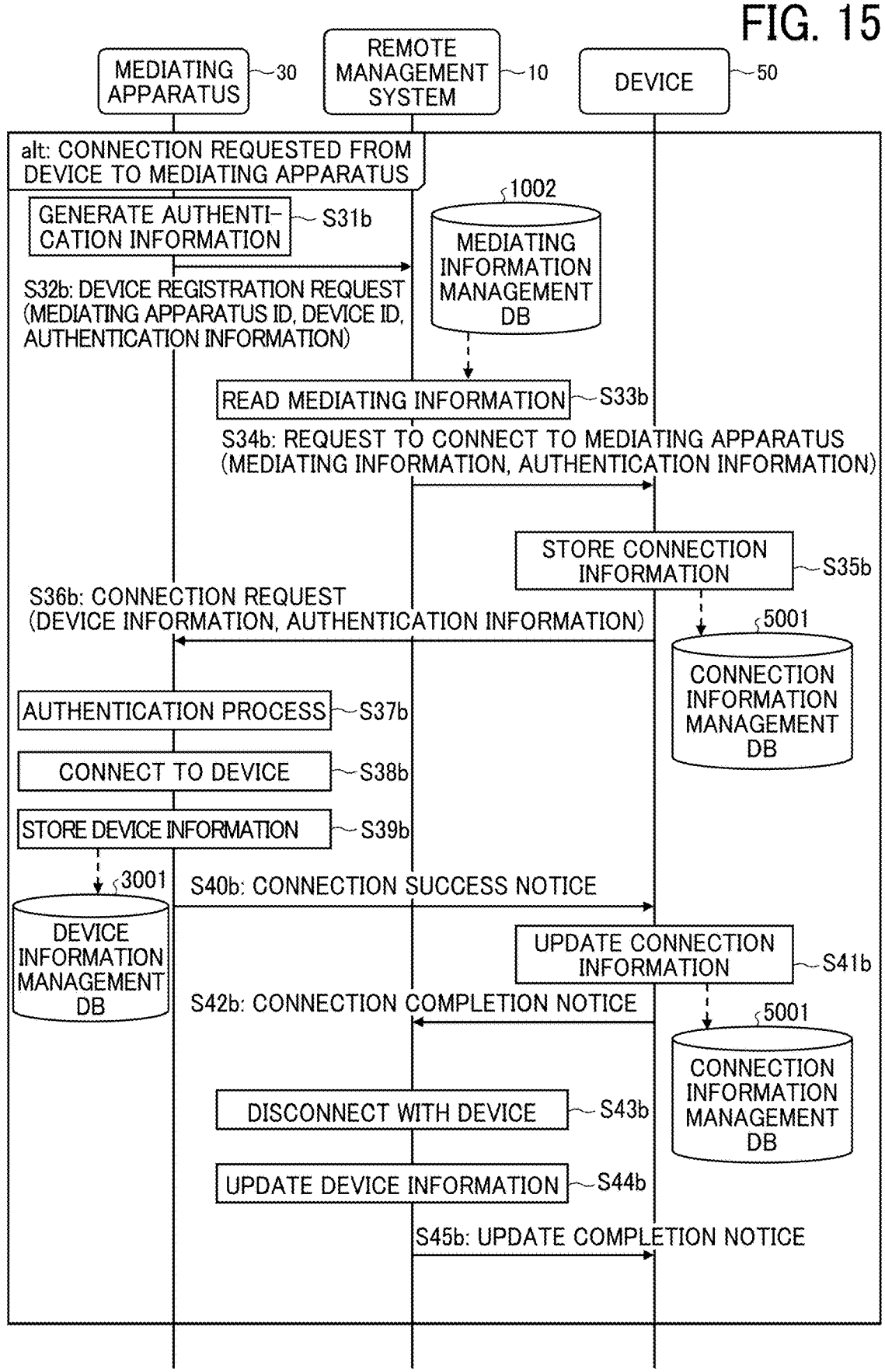
FIG. 15 is a sequence diagram illustrating another example of the connection process between the newly installed mediating apparatus and the device in the device management system according to embodiments of the present disclosure.

With reference to FIGS. 8 to 25, a processing or operation of the device management system according to the present embodiment is described. A process of establishing a connection between the mediating apparatus 30 and the device 50 is described with reference to FIGS. 8 to 15. FIGS. 8, 14, and 15 are sequence diagrams illustrating examples of a connection process between a newly installed mediating apparatus and the device in the device management system according to the present embodiment. In the following description, it is assumed that the device 50 is directly connected to the remote management system 10 for communication.

In step S11, the display control unit 34 of the mediating apparatus 30 causes the display 106 to display an initial setting screen for performing initial settings at the time of installation of the mediating apparatus 30 in response to an input operation or the like on the input device by the device administrator. The initial setting screen 200 illustrated in FIG. 9 includes mediating apparatus information of the mediating apparatus 30 and a "register in remote management system" button 215 to be pressed to start a registration of the mediating apparatus 30 in the remote management system 10. The mediating apparatus information indicates the registration status in the remote management system 10, the address of the remote management system 10 that communicates with the mediating apparatus 30, the mediating apparatus number, the IP address, and the MAC address of the mediating apparatus 30. In the example of FIG. 9, since the mediating apparatus 30 is not registered in the remote management system 10, the registration status is "not registered", and the addresses of the remote management system 10 and the mediating apparatus number are blank ("-").

Figure 10:
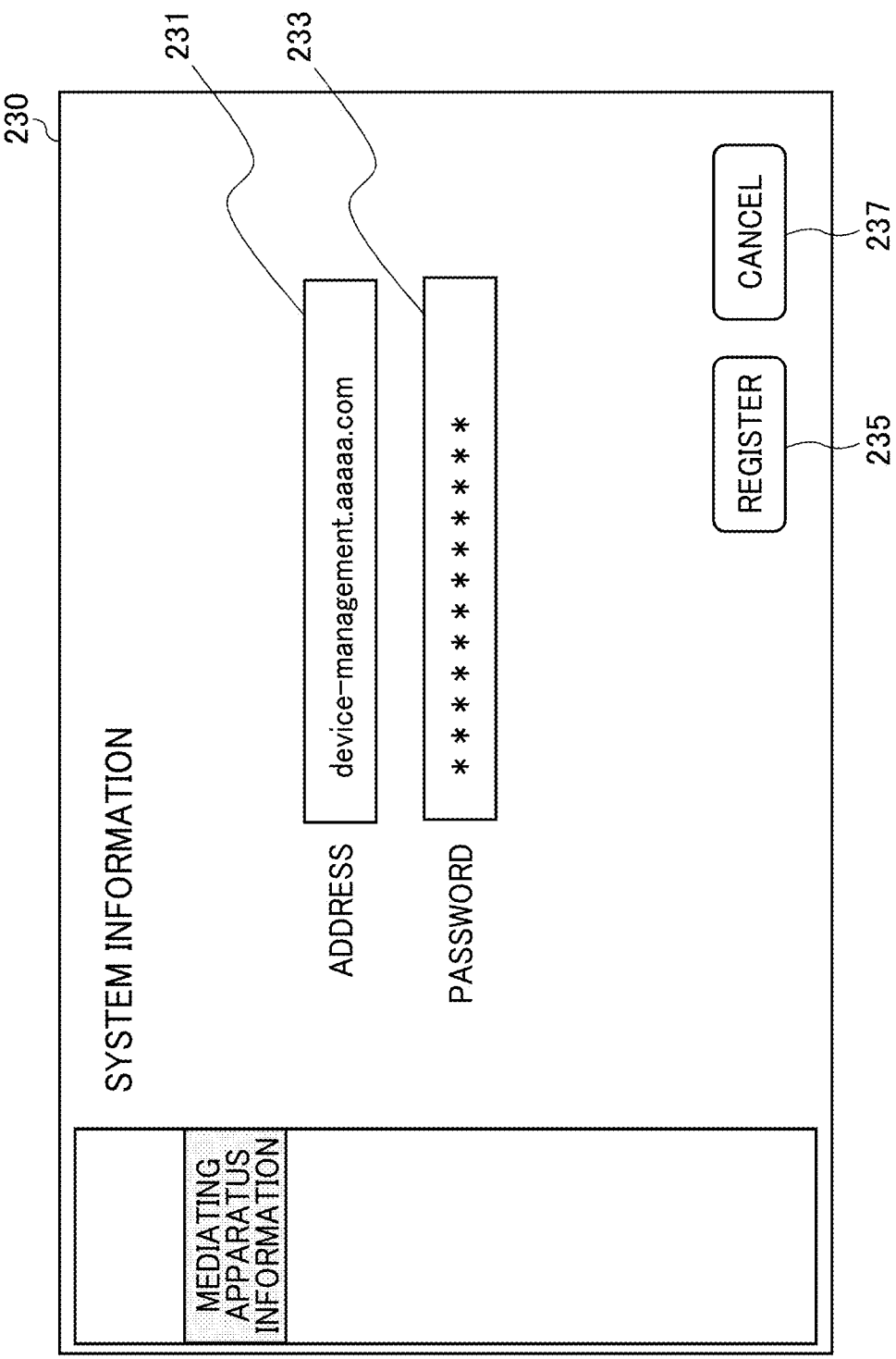
FIG. 10 is a diagram illustrating another example of the initial setting screen displayed on the mediating apparatus according to embodiments of the present disclosure.

In step S12, in response to the pressing of the "register in remote management system" button 215 by the device administrator, the reception unit 33 receives a system registration request for requesting registration of the mediating apparatus 30 in the remote management system 10. Then, the display control unit 34 switches the display 106 from the initial setting screen 200 illustrated in FIG. 9 to the initial setting screen 230 illustrated in FIG. 10. The initial setting screen 230 illustrated in FIG. 10 is a display screen for the mediating apparatus 30 to access the remote management system 10. The initial setting screen 230 includes an input field 231 for inputting the address of the remote management system 10, an input field 233 for inputting a password for accessing the remote management system 10, a "register" button 235 to be pressed when requesting registration in the remote management system 10, and a "cancel" button 237 to be pressed when terminating the system registration process.

In step S13, the reception unit 33 receives the input of the system information of the remote management system 10 in response to the device administrator inputting an address and a password in the input fields 231 and 233 respectively and pressing the "register" button 235. In step S14, the system information management unit 38 stores the system information including the address and the password received in step S13 in the system information management DB 3002 (refer to FIG. 6B).

In step S15, the network communication unit 31 of the mediating apparatus 30 transmits a mediating information registration request indicating a request for registration of the mediating apparatus 30 to the remote management system 10 that is the destination indicated by the address received in step S13. The mediating information registration request includes mediating apparatus information including destination information indicating the destination of the mediating apparatus 30 and the password received in step S13. Accordingly, the mediating apparatus communication unit 11 of the remote management system 10 receives the mediating information registration request transmitted from the mediating apparatus 30.

In step S16, the authentication unit 13 of the remote management system 10 executes authentication of the mediating apparatus 30 using the password received in step S15. When the received password matches password stored in the authentication unit 13, the authentication unit 13 permits access of the mediating apparatus 30. In response to a permission of access of the mediating apparatus 30, the remote management system 10 executes the following processing.

In step S17, the mediating information management unit 16 generates a mediating apparatus ID for identifying the mediating apparatus 30 that made the registration request. In step S18, the mediating information management unit 16 stores the mediating information in which the mediating apparatus ID generated in step S17 and the mediating apparatus information received in step S15 are associated with each other in the mediating information management DB 1002 (refer to FIG. 4B). In this step, the mediating information management unit 16 assigns the mediating apparatus number of the mediating apparatus 30 and registers the mediating apparatus number as the mediating information.

In step S19, the mediating apparatus communication unit 11 transmits a registration completion notice indicating that the registration of the mediating information is completed to the mediating apparatus 30 of the request source. The registration completion notice includes the mediating information stored in step S18. Accordingly, the network communication unit 31 of the mediating apparatus 30 receives the registration completion notice transmitted from the remote management system 10.

Figure 11:
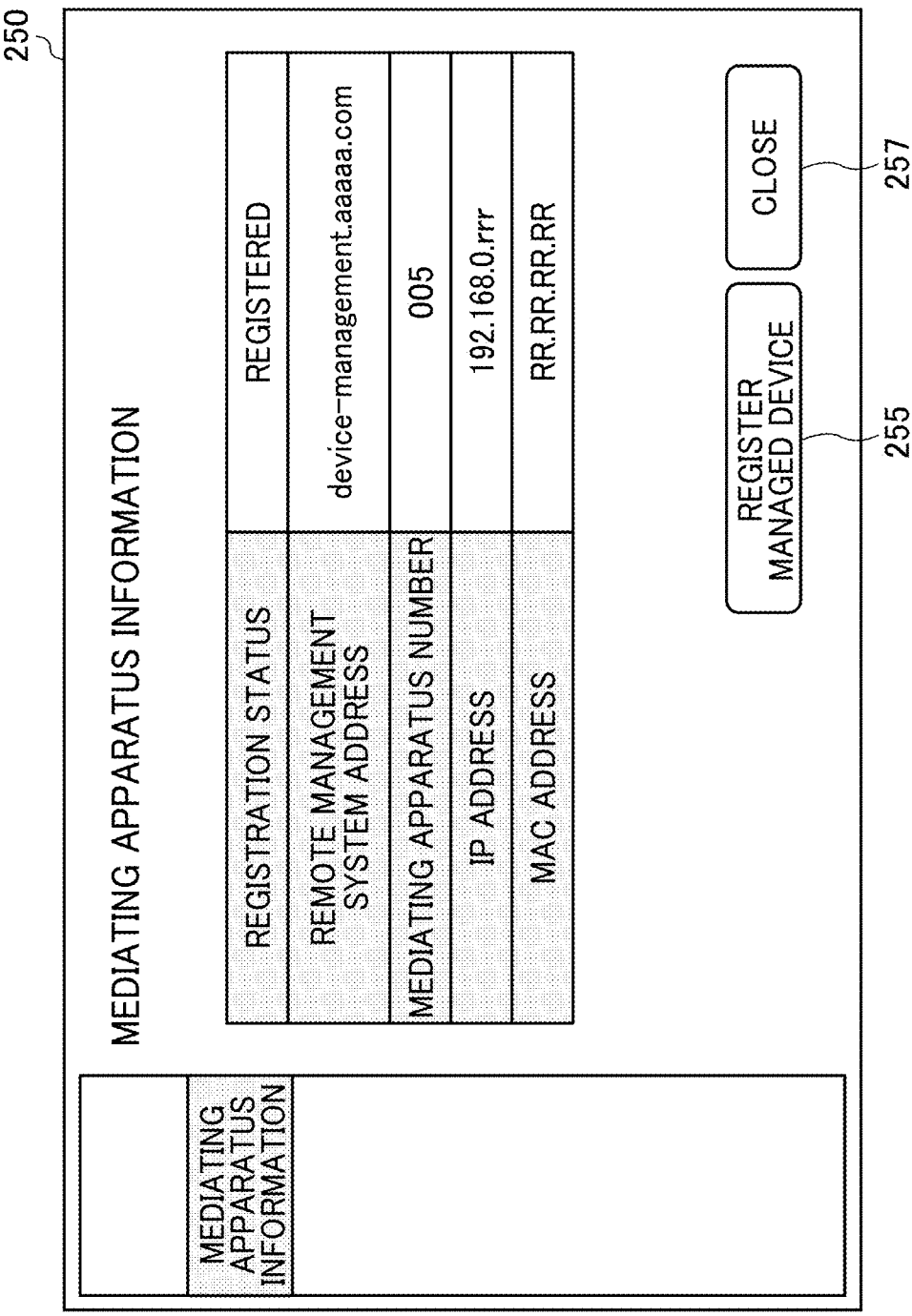
FIG. 11 is a diagram illustrating another example of the initial setting screen displayed on the mediating apparatus according to embodiments of the present disclosure.

In response to receiving the registration completion notice, the display control unit 34 of the mediating apparatus 30 switches the screen displayed on the display 106 from the initial setting screen 230 illustrated in FIG. 10 to the initial setting screen 250 illustrated in FIG. 11. The initial setting screen 250 illustrated in FIG. 11 includes the address of the remote management system 10 and the mediating apparatus number that were blank in the initial setting screen 200. The address of the remote management system 10 is the address of the remote management system 10 that has transmitted the registration completion notice in step S19. The initial setting screen 250 includes the mediating apparatus information of the mediating apparatus 30, a "register managed device" button 255 to be pressed when starting device registration, and a "close" button 257 to be pressed when terminating the initial settings. In step S20, the reception unit 33 receives a device registration start request for starting device registration under the control of the mediating apparatus 30 in response to the pressing of the "register managed device" button 255 by the device administrator.

In step S21, the network communication unit 31 transmits to the remote management system 10, a device registration start request indicating a request to start device registration, in response to receiving the device registration start request in step S20. Accordingly, the mediating apparatus communication unit 11 of the remote management system 10 receives the device registration start request transmitted from the mediating apparatus 30.

In step S22, the device information management unit 15 of the remote management system 10 reads the device information registered in the device information management DB 1001 (refer to FIG. 4A) through the storing and reading unit 19. In step S23, the mediating information management unit 16 reads the mediating information stored in the mediating information management DB 1002 (refer to FIG. 4B) through the storing and reading unit 19. In step S24, the device management control unit 18 provides (transmits) a device management user interface for changing the network configuration of the device management system 1 to the mediating apparatus 30 of the request source. In step S25, the display control unit 34 of the mediating apparatus 30 causes the display 106 to display a connection status display screen indicating the connection status of the communication of the device 50 using the device management user interface provided by the device management control unit 18.

The connection status display screen 300 illustrated in FIG. 12A includes a mediating apparatus list button 301 to display a list of mediating apparatus 30 registered in the remote management system 10, and a managed device list button 303 to display a list of devices 50 registered in the remote management system 10. The connection status display screen 300 illustrated in FIG. 12A indicates a state in which the managed device list button 303 is selected and displays a list of device information of the devices 50 registered in the remote management system 10. The connection status display screen 300 displays, for example, a device A connected to a mediating apparatus A and a device B connected to a mediating apparatus B. The connection status display screen 300 in FIG. 12A indicates, for example, a device C and a device D connected to the remote management system 10 and the communication between a device E and the mediating apparatus A is disconnected.

On the other hand, the connection status display screen 310 illustrated in FIG. 12B indicates a state in which the mediating apparatus list button 301 is selected and displays a list of mediating information of the mediating apparatus 30 registered in the remote management system 10. The connection status display screen 310 indicates, for example, the mediating apparatus A and the mediating apparatus E connected to the remote management system 10, and the mediating apparatus C is not connected to the remote management system 10 (disconnected). The connection status display screen 310 includes an "add managed device" button 311 (311a, 311b, 311c) for each mediating apparatus 30, to be pressed when adding a managed device 50 under the control of the mediating apparatus 30.

In step S26, in response to a pressing of the "add managed device" button 311 included in the connection status display screen 310 by the device administrator, the reception unit 33 receives the selection of the target mediating apparatus 30. For example, in response to the device administrator pressing the "add managed device" button 311c, the reception unit 33 receives selection of the mediating apparatus E as the mediating apparatus 30 to add a device to be managed. Then, the display control unit 34 switches the display 106 from the connection status display screen 310 illustrated in FIG. 12B to the connection status display screen 330 illustrated in FIG. 13A. The connection status display screen 330 illustrated in FIG. 13A is a display screen for selecting the device 50 to be registered in the mediating apparatus 30 selected in step S26. The connection status display screen 330 includes an "add managed device" button 331 to be pressed when adding the selected device 50 as a management target of the mediating apparatus 30, a "delete managed device" button 333 to be pressed to delete the selected device 50 from the management target of the mediating apparatus 30, and a "cancel" button 335 to be pressed when terminating the device registration.

In step S27, in response to the device administrator selecting the device 50 to be registered in the mediating apparatus E and pressing the "add managed device" button 331, the reception unit 33 receives the selection of the device 50 to be added under the control of mediating apparatus 30. In the case of FIG. 13A, the reception unit 33 receives the selection of the device C as the device 50 to be added.

As described above, when newly installing the mediating apparatus 30 in the local network 7, the device administrator can connect the mediating apparatus 30 to the remote management system 10 by using the initial setting screen displayed on the mediating apparatus 30. The device administrator can select the device 50 to be registered under the control of the mediating apparatus 30 by using the connection status display screen displayed on the mediating apparatus 30 by the device management user interface provided from the remote management system 10. Since the device management system 1 allows the device administrator to select the device 50 to be connected to the mediating apparatus 30 from the devices 50 registered in the remote management system 10 by using the connection status display screen, it is possible to change the network configuration for switching the communication connection so that the device 50 directly connected to the remote management system 10 can be connected to the mediating apparatus 30.

With reference to FIGS. 14 and 15, subsequent processing when the device 50 selected in step S27 is connected to the mediating apparatus 30 is described separately for a case where a connection request is made from the mediating apparatus 30 to the device 50 and a case where a connection request is made from the device 50 to the mediating apparatus 30.

With reference to FIG. 14, a description is given of processing in a case where a connection request is made from the mediating apparatus 30 to a device 50 including an application programming interface (API) configured to receive the connection request from the mediating apparatus 30. In step S31a, the network communication unit 31 of the mediating apparatus 30 transmits, to the remote management system 10, a device registration request indicating a request for registration of the device 50 selected in step S27 to the mediating apparatus 30 selected in step S26. The device registration request includes the mediating apparatus ID of the mediating apparatus 30 selected in step S26 and the device ID of the device 50 selected in step S27. Accordingly, the mediating apparatus communication unit 11 of the remote management system 10 receives the device registration request transmitted from the mediating apparatus 30.

In step S32a, the authentication unit 13 of the remote management system 10 generates authentication information to be used for authentication between the mediating apparatus 30 and the device 50. In step S33a, the device communication unit 12 transmits the authentication information generated in step S32a and the mediating apparatus ID received in step S31a to the device 50 having the device ID received in step S31a. Accordingly, the network communication unit 51 of the device 50 receives the authentication information transmitted from the remote management system 10.

In step S34a, the information management unit 57 of the device 50 stores the authentication information and the mediating apparatus ID received in step S33a in the connection information management DB 5001 (refer to FIG. 7) in association with each other. The information management unit 57 stores the received authentication information and mediating apparatus ID in the connection information management DB 5001 as the connection information of the mediating apparatus 30. In step S35a, the network communication unit 51 transmits to the remote management system 10, a reception notice indicating that the authentication information is received.

In step S36a, the connection control unit 17 of the remote management system 10 disconnects the communication with the device 50 that has transmitted the reception notice in step S35a. In step S37a, the device information management unit 15 searches the device information management DB 1001 (refer to FIG. 4A) using the device ID of the device 50 disconnected in step S36a as a search key and reads the device information associated with the same device ID as the device ID of the disconnected device 50 through the storing and reading unit 19. In step S38a, the mediating apparatus communication unit 11 transmits the device information read in step S37a and the authentication information generated in step S32a to the mediating apparatus 30. Accordingly, the network communication unit 31 of the mediating apparatus 30 receives various types of information transmitted from the remote management system 10.

In step S39a, the device information management unit 37 of the mediating apparatus 30 stores the device information received in step S38a in the device information management DB 3001 (refer to FIG. 6A). In step S40a, the device communication unit 32 transmits, to the device 50 selected in step S27, a connection request indicating a request to connect to the mediating apparatus 30. The connection request includes the authentication information received in step S38a. Accordingly, the mediating apparatus communication unit 52 of the device 50 receives the connection request transmitted from the mediating apparatus 30.

In step S41a, the authentication unit 55 of the device 50 executes authentication process of the mediating apparatus 30 using the authentication information received in step S40a. When the received authentication information matches the authentication information stored in the connection information management DB 5001 (refer to FIG. 7) in step S34a, the authentication unit 55 permits access by the mediating apparatus 30. In response to permitting the access of the mediating apparatus 30, the device 50 executes subsequent processing.

In step S42a, the connection control unit 58 executes a connection process for communication with the mediating apparatus 30 authenticated in step S41a. The information management unit 57 stores the mediating information of the mediating apparatus 30 connected by the connection control unit 58 in association with the mediating apparatus ID stored in the connection information management DB 5001 in step S34a. In addition, the information management unit 57 updates the connection status with the mediating apparatus 30 to "connected". On the other hand, the information management unit 57 deletes the connection information of the remote management system 10 disconnected in step S36a from the connection information management DB 5001. In step S43a, the mediating apparatus communication unit 52 transmits a connection success notice indicating that the connection with the mediating apparatus 30 is successful to the mediating apparatus 30. Accordingly, the device communication unit 32 of the mediating apparatus 30 receives the connection success notice transmitted from the device 50.

In step S44a, the network communication unit 31 of the mediating apparatus 30 transmits a connection completion notice indicating that the connection with the device 50 is completed to the remote management system 10. Accordingly, the mediating apparatus communication unit 11 of the remote management system 10 receives the connection completion notice transmitted from the mediating apparatus 30. In step S45a, the device information management unit 15 of the remote management system 10 updates the device information stored in the device information management DB 1001. The device information management unit 15 stores the mediating apparatus ID received in step S31a in the device information management DB 1001 in association with the device ID received in step S31a. Accordingly, the remote management system 10 can manage a state in which the device 50 is connected to the mediating apparatus 30, that is, a state in which the device 50 is registered under the control of the mediating apparatus 30. In step S46a, the mediating apparatus communication unit 11 transmits an update completion notice indicating that the update of the device information is completed to the mediating apparatus 30. Accordingly, the network communication unit 31 of the mediating apparatus 30 receives the update completion notice transmitted from the remote management system 10.

With reference to FIG. 15, a process when a connection request is made from the device 50 to the mediating apparatus 30 in response to a command from the remote management system 10 is described. In step S31*b*, the authentication unit 35 of the mediating apparatus 30 generates authentication information to be used for authentication of the device 50. In step S32*b*, the network communication unit 31 transmits a device registration request to the remote management system 10 indicating a request to register the device 50 selected in step S27 with the mediating apparatus 30 selected in step S26. This device registration request includes the mediating apparatus ID of the mediating apparatus 30 selected in step S26, the device ID of the device 50 selected in step S27, and the authentication information generated in step S31*b*. Accordingly, the mediating apparatus communication unit 11 of the remote management system 10 receives the device registration request transmitted from the mediating apparatus 30.

In step S33*b*, the mediating information management unit 16 of the remote management system 10 searches the mediating information management DB 1002 using the mediating apparatus ID received in step S32*b* as a search key and reads through the storing and reading unit 19, the mediating information associated with the same mediating apparatus ID as the received mediating apparatus ID. In step S34*b*, the device communication unit 12 transmits to the device 50 with the device ID received in step S32*b*, a connection request to connect to the mediating apparatus 30 for which the device registration request was transmitted in step S32*b*. The connection request includes the mediating information read in step S33*b* and the authentication information received in step S32*b*. Accordingly, the network communication unit 51 of the device 50 receives the connection request transmitted from the remote management system 10.

In step S35*b*, the information management unit 57 of the device 50 stores the mediating information and the authentication information received in step S34*b* in association with each other in the connection information management DB 5001. The information management unit 57 stores the received authentication information and mediating information in the connection information management DB 5001 as connection information of the mediating apparatus 30. In step S36*b*, the mediating apparatus communication unit 52 transmits a connection request indicating that the connection with the device 50 is requested to the mediating apparatus 30 corresponding to the mediating information received in step S34*b*. The connection request includes the device information of the device 50 and the authentication information received in step S34*b*. Accordingly, the device communication unit 32 of the mediating apparatus 30 receives the connection request transmitted from the device 50.

In step S37*b*, the authentication unit 35 of the mediating apparatus 30 executes an authentication process of the device 50 using the authentication information received in step S36*b*. When the received authentication information and the authentication information generated in step S31*b* match, the authentication unit 35 permits access by the device 50. In response to permitting the access of the device 50, the mediating apparatus 30 executes subsequent processing as follows.

In step S38*b*, the connection control unit 41 executes a connection process for communication with the device 50 authenticated in step S37*b*. In step S39*b*, the device information management unit 37 stores the device information of the device 50 connected in step S38*b* in the device information management DB 3001. In step S40*b*, the device communication unit 32 transmits a connection success notice indicating that the connection with the mediating apparatus 30 is successful to the device 50. Accordingly, the mediating apparatus communication unit 52 of the device 50 receives the connection success notice transmitted from the mediating apparatus 30.

In step S41*b*, the information management unit 57 of the device 50 updates the connection information stored in the connection information management DB 5001. The information management unit 57 updates the connection status with the mediating apparatus 30 included in the connection information of the mediating apparatus 30 stored in the connection information management DB 5001 in step S35*b* to "connected". On the other hand, the information management unit 57 deletes the connection information of the remote management system 10 from the connection information management DB 5001.

In step S42*b*, the network communication unit 51 of the device 50 transmits a connection completion notice indicating that the connection of the device 50 is completed to the remote management system 10. Accordingly, the device communication unit 12 of the remote management system 10 receives the connection completion notice transmitted from the device 50.

In step S43*b*, the connection control unit 17 of the remote management system 10 disconnects the communication with the device 50 that transmitted the connection completion notice in step S42*b*. In step S44*b*, the device information management unit 15 updates the device information stored in the device information management DB 1001. The device information management unit 15 stores the mediating apparatus ID received in step S32*b* in the device information management DB 1001 in association with the device ID received in step S32*b*. Accordingly, the remote management system 10 can manage a state in which the device 50 is connected to the mediating apparatus 30, that is, a state in which the device 50 is registered under the control of the mediating apparatus 30. In step S45*b*, the device communication unit 12 transmits an update completion notice indicating that the update of the device information is completed to the device 50. Accordingly, the network communication unit 51 of the device 50 receives the update completion notice transmitted from the remote management system 10.

As described above, in response to the operation by the device administrator using the connection status display screen displayed on the mediating apparatus 30, the device management system 1 disconnects the communication between the remote management system 10 and the device 50 and connects the communication between the mediating apparatus 30 and the device 50. As a result, the connection setting between the mediating apparatus 30 and the device 50 can be simplified. The connection status display screen 350 illustrated in FIG. 13B displays a state in which the device 50 is connected to the mediating apparatus 30 through the process illustrated in FIG. 14 or FIG. 15. As illustrated in FIG. 13B, in the device management system 1, the device C directly connected to the remote management system 10 is connected under the control of the mediating apparatus E.

Figure 16:
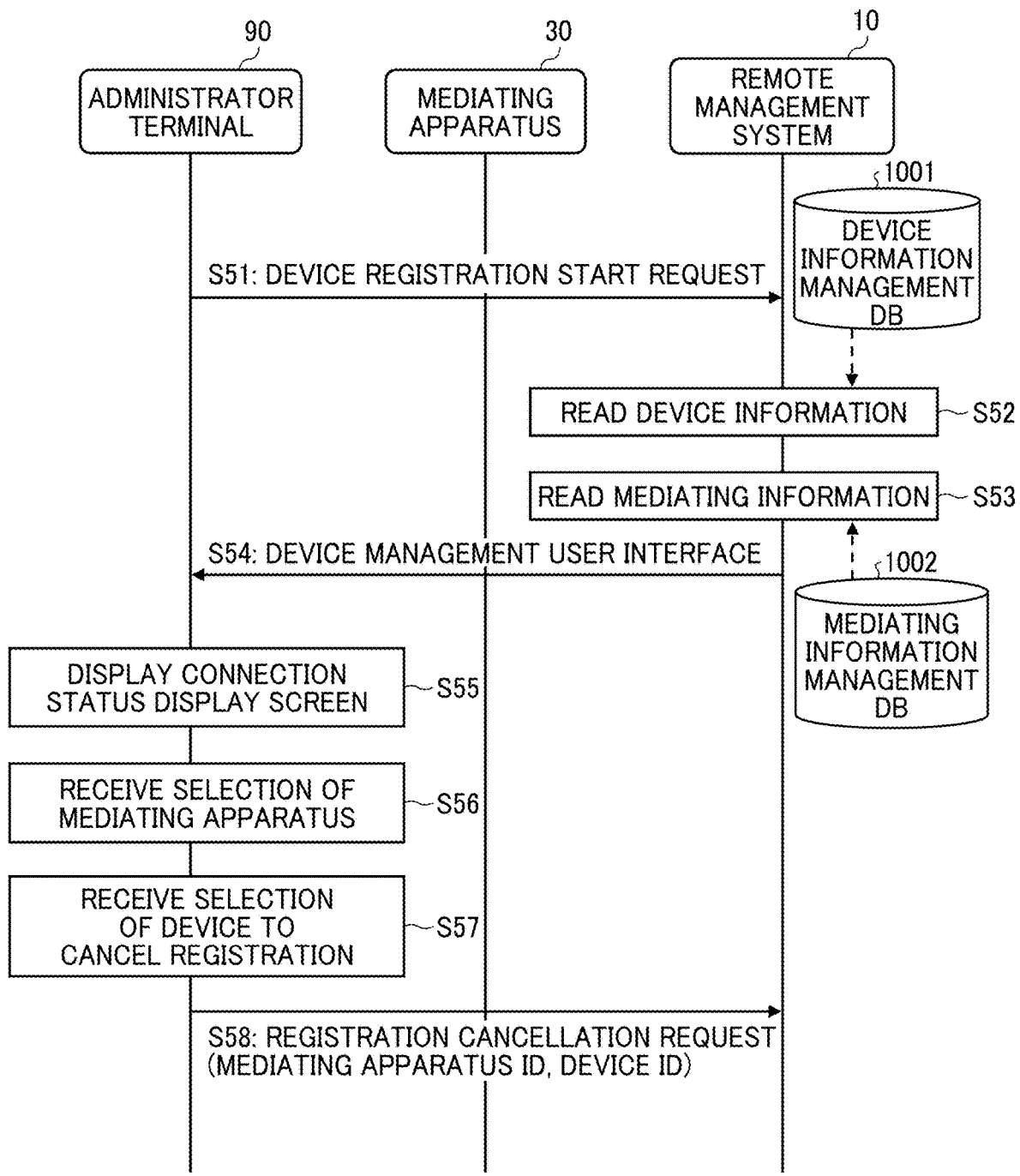
FIG. 16 is a sequence diagram illustrating an example of a connection process of the device connected to the mediating apparatus to the remote management system in the device management system according to embodiments of the present disclosure.
Figure 17:
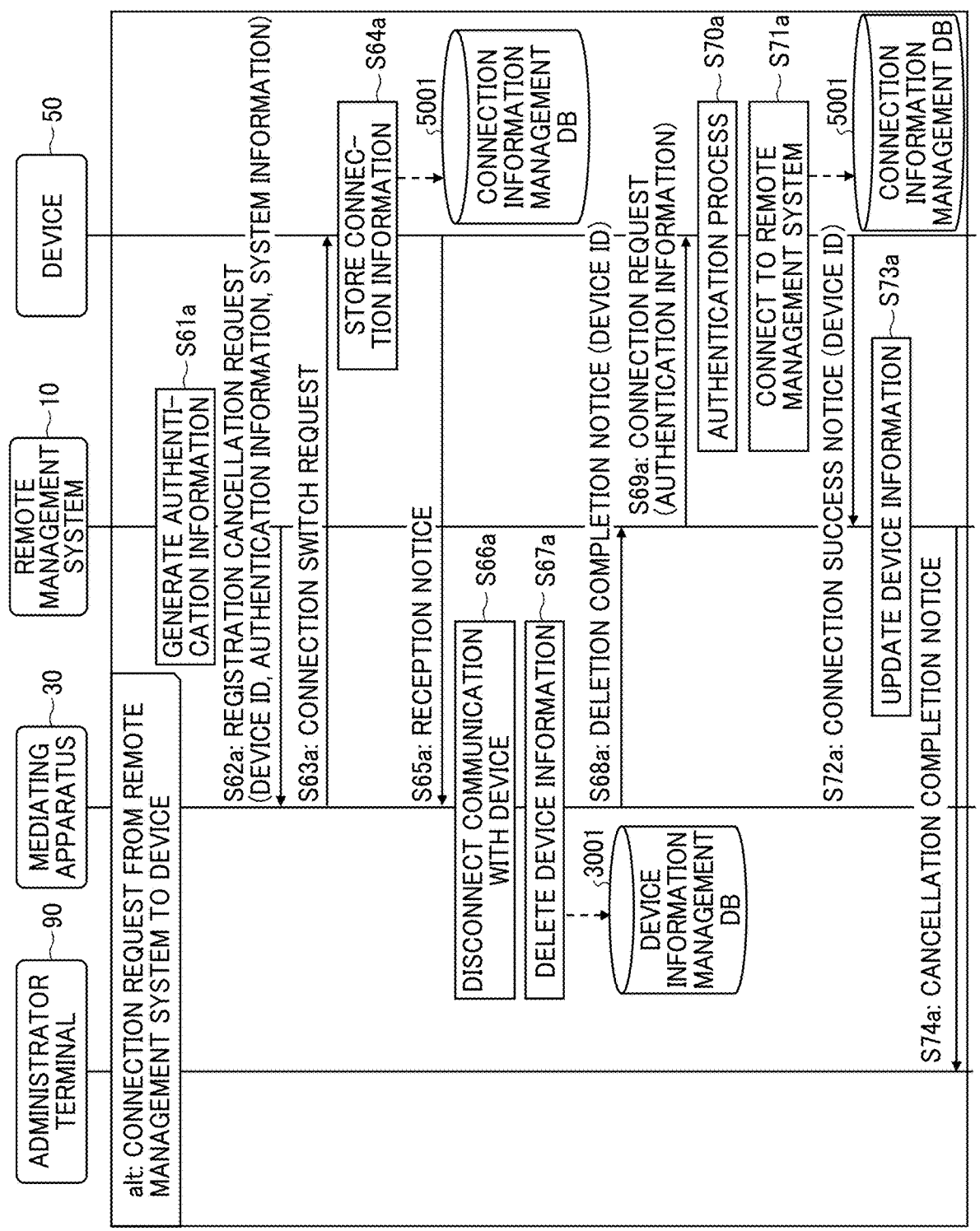
FIG. 17 is a sequence diagram illustrating another example of the connection process of the device connected to the mediating apparatus to the remote management system in the device management system according to embodiments of the present disclosure.
Figure 18:
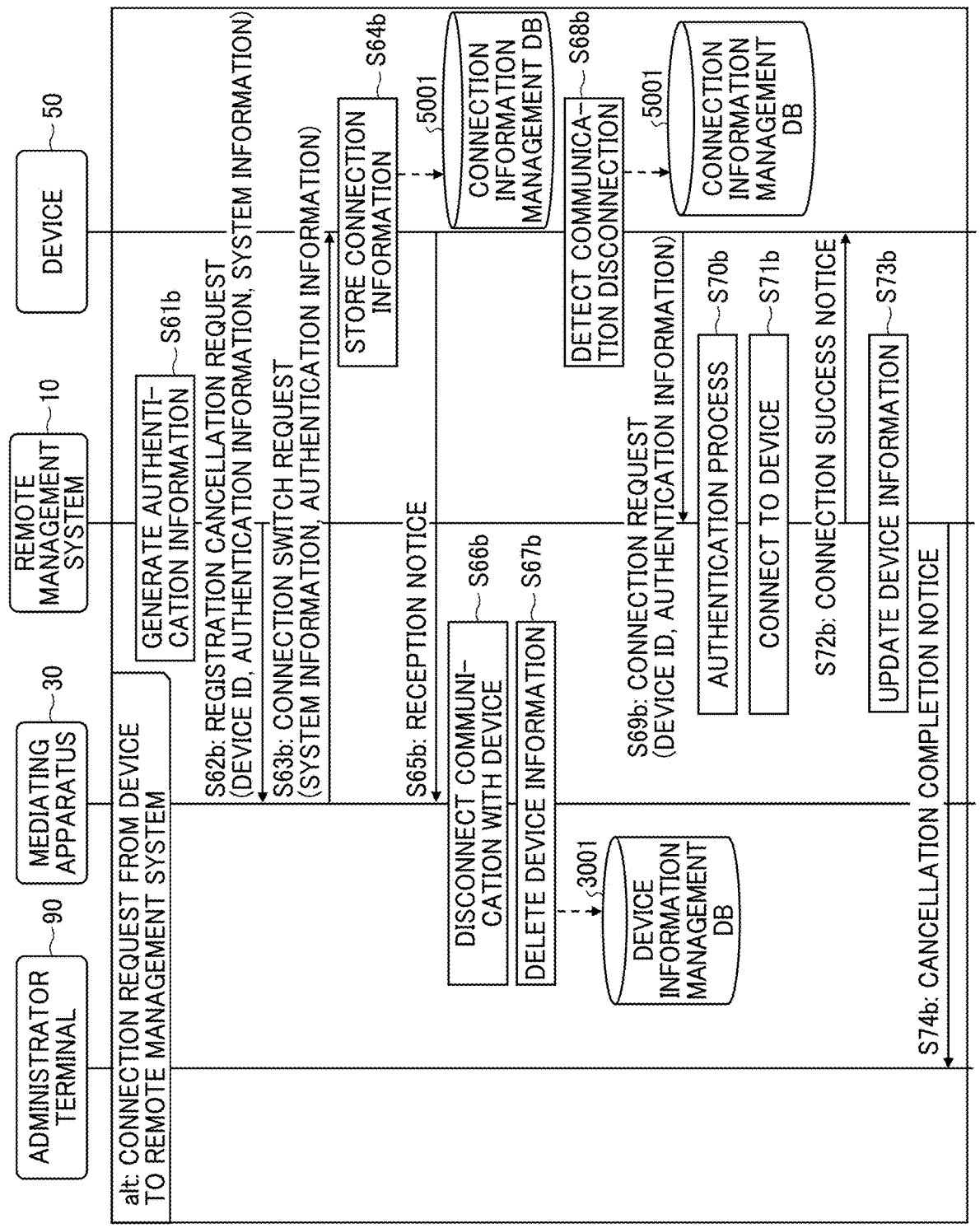
FIG. 18 is a sequence diagram illustrating another example of the connection process of the device connected to the mediating apparatus to the remote management system in the device management system according to embodiments of the present disclosure.

With reference to FIGS. 16 to 18, a process in which the device 50 connected to the mediating apparatus 30 is disconnected and then directly connected to the remote management system 10 is described. FIGS. 16 to 18 are sequence diagrams illustrating an example of a process of connecting a device registered under the control of the mediating apparatus to the remote management system in the device management system according to the present embodiment. FIGS. 16 to 18 illustrates an example where the network configuration of the device management system 1 is changed by using the administrator terminal 90 operated by the device administrator.

In step S51, the communication unit 91 of the administrator terminal 90 transmits a device registration start request indicating that the remote management system 10 is requested to start device registration in response to an input operation or the like of the device administrator. Accordingly, the terminal communication unit 21 of the remote management system 10 receives the device registration start request transmitted from the administrator terminal 90.

In step S52, the device information management unit 15 of the remote management system 10 reads the device information stored in the device information management DB 1001 (refer to FIG. 4A) through the storing and reading unit 19. In step S53, the mediating information management unit 16 reads the mediating information stored in the mediating information management DB 1002 (refer to FIG. 4B) through the storing and reading unit 19. In step S54, the device management control unit 18 provides (transmits) a device management user interface for changing the network configuration of the device management system 1 to the requesting administrator terminal 90. In step S55, the display control unit 93 of the administrator terminal 90 uses the device management user interface provided by the device management control unit 18 to display a connection status display screen displaying the communication connection status of the device 50 on the display 106. This connection status display screen is similar to the content illustrated in FIGS. 12A, 12B, 13A, and 13B.

In step S56, in response to the pressing of the "add managed device" button 311 included in the connection status display screen 310 (see FIG. 12B) by the device administrator, the reception unit 92 receives the selection of the target mediating apparatus 30. Then, the display control unit 93 switches the display 106 from the connection status display screen 310 illustrated in FIG. 12B to the connection status display screen 330 illustrated in FIG. 13A.

In step S57, the device administrator selects the device 50 and presses the "delete managed device" button 333 and the reception unit 92 accepts the selection of the device 50 for canceling the registration in the mediating apparatus 30. In step S58, the communication unit 91 transmits, to the remote management system 10, a registration cancellation request indicating a request to cancel the registration of the device 50 selected in step S57 with the mediating apparatus 30 selected in step S56. The registration cancellation request includes the mediating apparatus ID of the mediating apparatus 30 selected in step S56 and the device ID of the device 50 selected in step S57. Accordingly, the mediating apparatus communication unit 11 of the remote management system 10 receives the device registration cancellation request transmitted from the administrator terminal 90.

In this way, the device administrator uses the connection status display screen displayed on the administrator terminal 90 by the device management user interface provided by the remote management system 10 and changes the network configuration so as to cancel the registration of the device 50 registered under the control of the mediating apparatus 30 and directly connect to the remote management system 10.

With reference to FIGS. 17 and 18, subsequent processing of an example of changing the configuration of the device 50 so as to directly communicate with the remote management system 10 in response to the registration cancellation request sent from the administrator terminal 90 in step S58 is described separately for a case in which the remote management system 10 makes a connection request to the device 50 and a case in which the device 50 makes a connection request to the remote management system 10.

With reference to FIG. 17, a process of making a connection request from the remote management system 10 to the device 50 is described. In step S61a, the authentication unit 13 of the remote management system 10 generates authentication information to be used for authentication with the device 50. In step S62a, the mediating apparatus communication unit 11 transmits a registration cancellation request to the mediating apparatus 30 corresponding to the mediating apparatus ID received in step S58 indicating a request to cancel the registration of the device 50 of the received device ID. The registration cancellation request includes the device ID received in step S58, the authentication information generated in step S61a, and the system information of the remote management system 10. As a result, the network communication unit 31 of the mediating apparatus 30 receives the registration cancellation request transmitted from the remote management system 10.

In step S63a, the device communication unit 32 of the mediating apparatus 30 transmits a connection switching request for requesting switching of the connection to the device 50 having the device ID received in step S62a. The connection switching request includes the system information and the authentication information received in step S62a. Accordingly, the mediating apparatus communication unit 52 of the device 50 receives the connection switching request transmitted from the mediating apparatus 30.

In step S64a, the information management unit 57 of the device 50 stores the system information and the authentication information received in step S63a in association with each other in the connection information management DB 5001 (refer to FIG. 7). The information management unit 57 stores the received system information and authentication information in the connection information management DB 5001 as the connection information of the remote management system 10. In step S65a, the mediating apparatus communication unit 52 transmits a reception notice indicating that the connection switching request has been received to the mediating apparatus 30 of the request source.

In step S66a, the connection control unit 41 of the mediating apparatus 30 disconnects the communication with the device 50 that has transmitted the reception notice in step S65a. In step S67a, the device information management unit 37 deletes the device information of the device 50 disconnected in step S66a from the device information management DB 3001 (refer to FIG. 6A). In step S68a, the network communication unit 31 transmits a deletion completion notice indicating that the deletion of the device information is completed to the remote management system 10. The deletion completion notice includes the device ID of the device 50 having device information deleted in step S67a. Accordingly, the mediating apparatus communication unit 11 of the remote management system 10 receives the deletion completion notice transmitted from the mediating apparatus 30.

In step S69a, the device communication unit 12 of the remote management system 10 transmits a connection request indicating that the device 50 having the device ID received in step S68a is requested to connect to the remote management system 10. The connection request includes the authentication information received in step S61a. Accordingly, the network communication unit 51 of the device 50 receives the connection request transmitted from the remote management system 10.

In step S70a, the authentication unit 55 of the device 50 executes the authentication process of the remote management system 10 using the authentication information received in step S69a. When the received authentication information matches the authentication information stored in the connection information management DB 5001 stored in step S64a, the authentication unit 55 permits access by the remote management system 10. When the access of the remote management system 10 is permitted, the device 50 executes the subsequent processing.

In step S71a, the connection control unit 58 executes a connection process for communication with the remote management system 10 authenticated in step S70a. The information management unit 57 updates the connection status with the remote management system 10 included in the connection information of the remote management system 10 stored in the connection information management DB 5001 in step S64a to "connected". On the other hand, the information management unit 57 deletes the connection information of the mediating apparatus 30 from the connection information management DB 5001. In step S72a, the network communication unit 51 transmits a connection success notice indicating that the connection with the remote management system 10 has been successful to the remote management system 10. The connection success notice includes the device ID of the device 50. Accordingly, the device communication unit 12 of the remote management system 10 receives the connection success notice transmitted from the device 50.

In step S73a, the device information management unit 15 of the remote management system 10 updates the device information registered in the device information management DB 1001. The device information management unit 15 deletes the mediating apparatus ID associated with the device ID received in step S72a. Thereby, the remote management system 10 can manage the state in which the device 50 is directly connected to the remote management system 10 without going through the mediating apparatus 30. In step S74a, the terminal communication unit 21 transmits a cancellation completion notice indicating that the registration cancellation is completed to the administrator terminal 90 that sent the registration cancellation request in step S58. Accordingly, the communication unit 91 of the administrator terminal 90 receives the cancellation completion notice transmitted from the remote management system 10.

With reference to FIG. 18, a process when a connection request is made from the device 50 to the remote management system 10 is described. Since a process of steps S61b to S67b is the same as a process of steps S61a to S67a illustrated in FIG. 17, the description thereof is omitted. In step S68b, the connection control unit 58 of the device 50 detects that the communication with the mediating apparatus 30 has been disconnected due to the processing of the remote management system 10 in step S67b. In step S69b, the network communication unit 51 transmits a connection request indicating that the connection with the device 50 is requested to the remote management system 10. The connection request includes the device ID of the device 50 and the authentication information received in step S63b. Accordingly, the device communication unit 12 of the remote management system 10 receives the connection request transmitted from the device 50.

In step S70b, the authentication unit 13 of the remote management system 10 uses the authentication information received in step S69b to execute an authentication process for the device 50. When the received authentication information and the authentication information generated in step S61b match, the authentication unit 13 permits access by the device 50. In response to a permission of access of the device 50, the remote management system 10 executes the following processing.

In step S71b, the connection control unit 17 executes a connection process for communication with the device 50 authenticated in step S70b. In step S72b, the device communication unit 12 transmits a connection success notice indicating that the connection with the device 50 is successful to the device 50. Accordingly, the network communication unit 51 of the device 50 receives the connection success notice transmitted from the remote management system 10.

In step S73b, the device information management unit 15 updates the device information stored in the device information management DB 1001. The device information management unit 15 deletes the mediating apparatus ID associated with the device ID received in step S69b. Thereby, the remote management system 10 can manage the state in which the device 50 is directly connected to the remote management system 10 without going through the mediating apparatus 30. In step S74b, the terminal communication unit 21 transmits a cancellation completion notice indicating that the registration cancellation is completed to the administrator terminal 90 that sent the registration cancellation request in step S58. Accordingly, the communication unit 91 of the administrator terminal 90 receives the cancellation completion notice transmitted from the remote management system 10.

In this way, the device management system 1 can switch the connection status and the device 50 connected to the mediating apparatus 30 can be directly connected to the remote management system 10. It is possible to reversibly shift the configuration in which the device 50 and the remote management system 10 communicate directly with each other and the configuration in which the device 50 and the remote management system communicate with each other through the mediating apparatus 30. As a result, the device management system 1 can select an optimum network configuration according to the situation. For example, the device management system 1 may perform communication through the mediating apparatus 30 normally and when it is necessary to place more importance on real-time communication, may switch to a configuration that does not involve the mediating apparatus 30. Note that FIG. 16 illustrates an example in which the device administrator changes the network configuration using the administrator terminal 90, but the device administrator may use the mediating apparatus 30 to perform the process illustrated in FIG. 16.

With reference to FIG. 19, a case in which the remote management system 10 manages the connection settings corresponding to a plurality of communication paths with the device 50 is described. The remote management system 10 needs to manage which connection status the device 50 is in when the remote management system 10 has a function of being able to set a connection through the mediating apparatus 30 while leaving a path for directly connecting to the device 50 for communication. Therefore, the storage unit 1000 of the remote management system 10 replaces the device information management table illustrated in FIG. 4A with the device information management table illustrated in FIG. 19 and configure the device information management DB 1001.

The device information management table illustrated in FIG. 19 includes usage status of the mediating apparatus 30 in addition to the configuration of the device information management table illustrated in FIG. 4A. The usage status of the mediating apparatus 30 indicates "YES" when the device 50 is using the mediating apparatus 30, and "NO" when the device 50 is not using the mediating apparatus 30. The device information management table illustrated in FIG. 19 holds information on the communication path to which the device 50 is connected as a truth value indicating whether the device 50 is using the mediating apparatus 30.

Similarly, in this case, the connection information management DB 5001 of the device 50 stores both the connection information of the mediating apparatus 30 and the connection information of the remote management system 10. For example, when the device 50 and the mediating apparatus 30 are connected, the connection status illustrated in the connection information of the mediating apparatus 30 is "connected", and the connection status illustrated in the connection information of the remote management system 10 is "disconnected (not connected)". On the other hand, when the device 50 and the remote management system 10 are directly connected, the connection status illustrated in the connection information of the mediating apparatus 30 is "disconnected (not connected)" and the connection status included in the connection information of the remote management system 10 is "connected".

By managing the usage status of the mediating apparatus 30 for each device 50, the remote management system 10 can store both the communication path in which the device 50 is directly connected to the remote management system 10 and the communication path in which the mediating apparatus 30 and the device 50 are connected. Further, even when the remote management system 10 is directly connected to the device 50, the information of the mediating apparatus 30 associated with the device 50 is not deleted and information on the communication path to which the device 50 is connected can be managed. In this way, by securing a plurality of communication paths, the remote management system 10 can be operated, for example, by directly connecting to the device 50 only when a malfunction occurs in the mediating apparatus 30 and communication is not possible. As a result, availability of the system can be improved.

Figure 20:
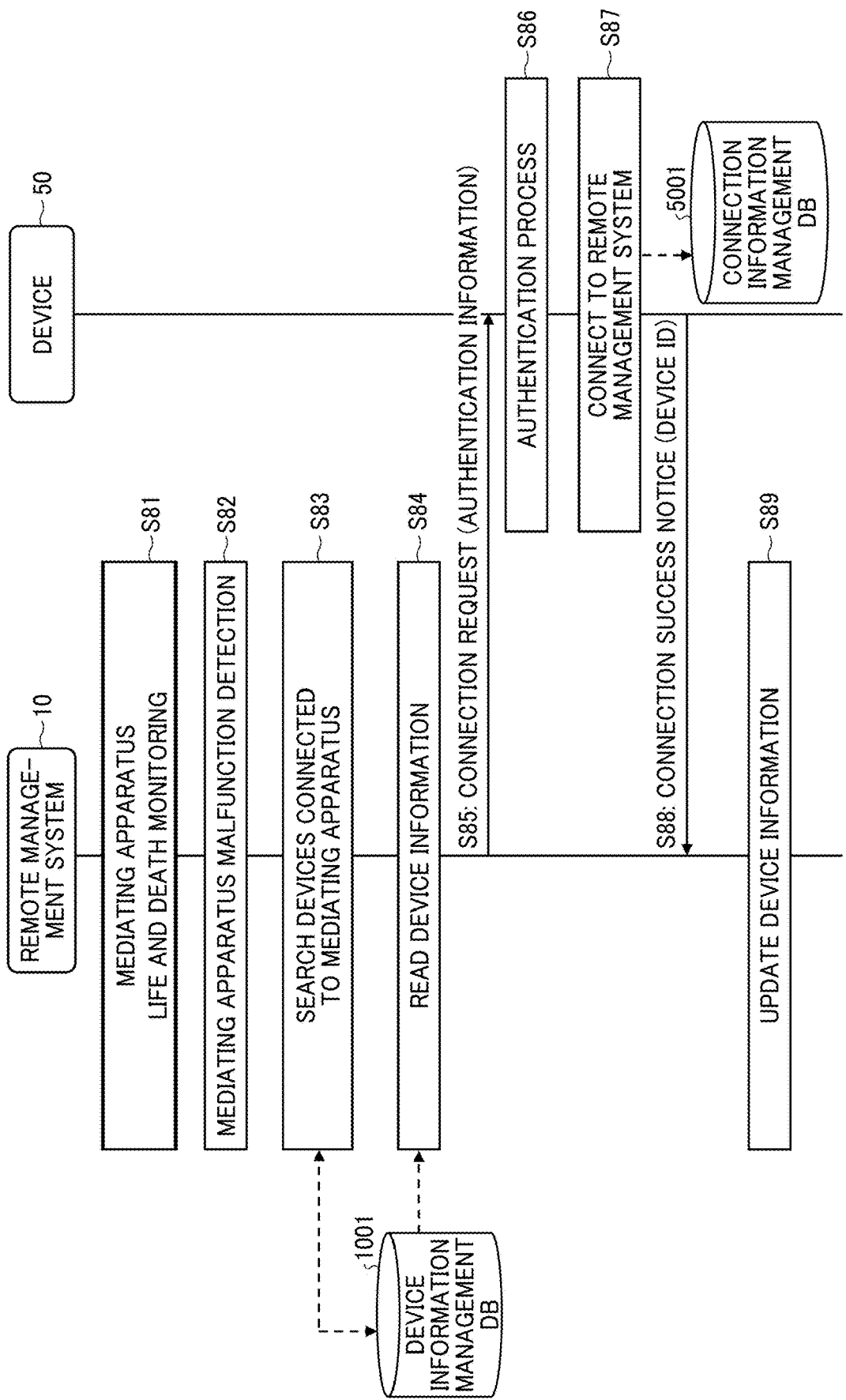
FIG. 20 is a sequence diagram illustrating an example of a process of connecting the device to the remote management system in response to a detection of a malfunction in the mediating apparatus in the device management system according to embodiments of the present disclosure.
Figure 21:
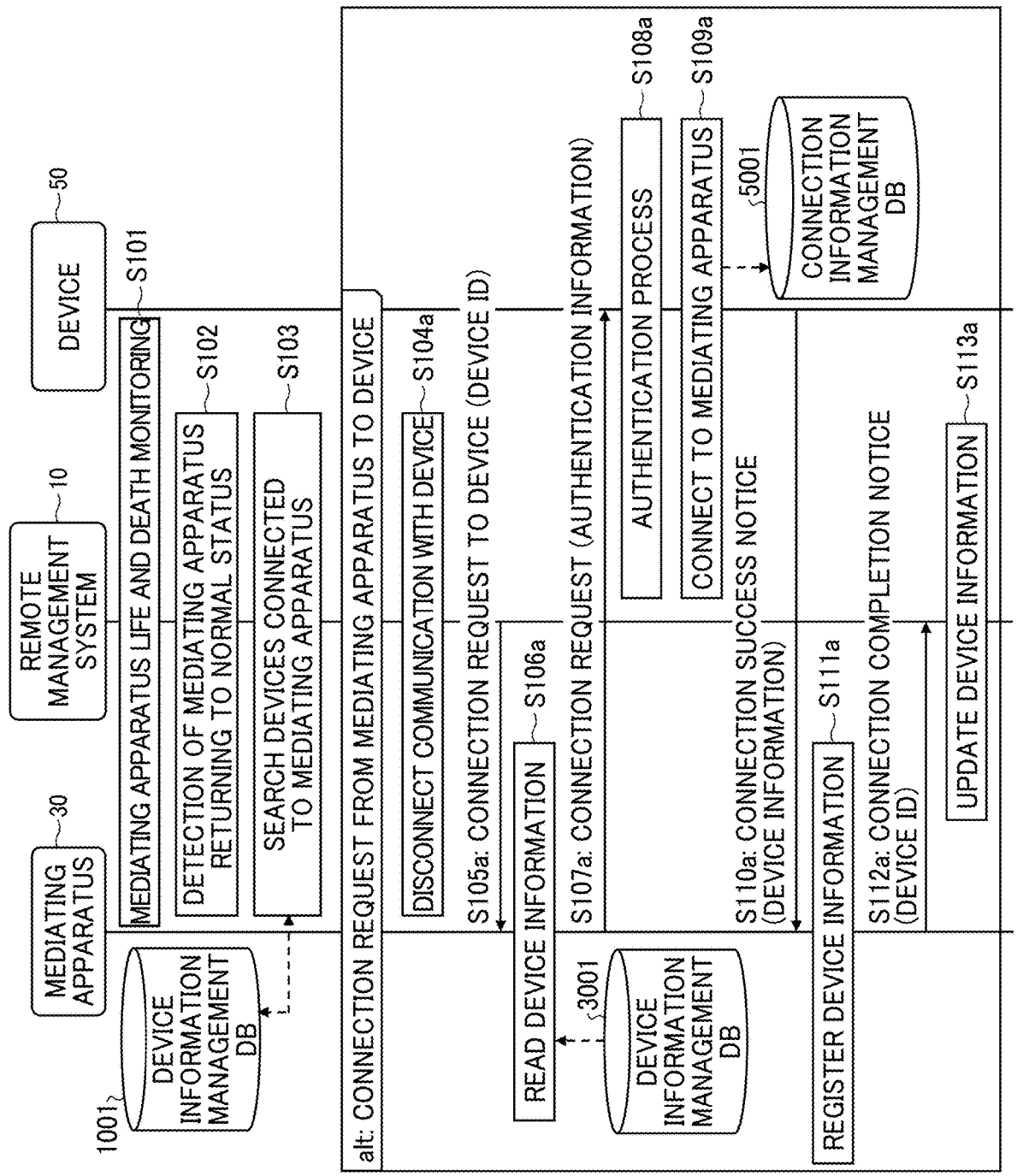
FIG. 21 is a sequence diagram illustrating an example of a process of connecting a device to a mediating apparatus in response to a restoration of the mediating apparatus in the device management system according to embodiments of the present disclosure.
Figure 22:
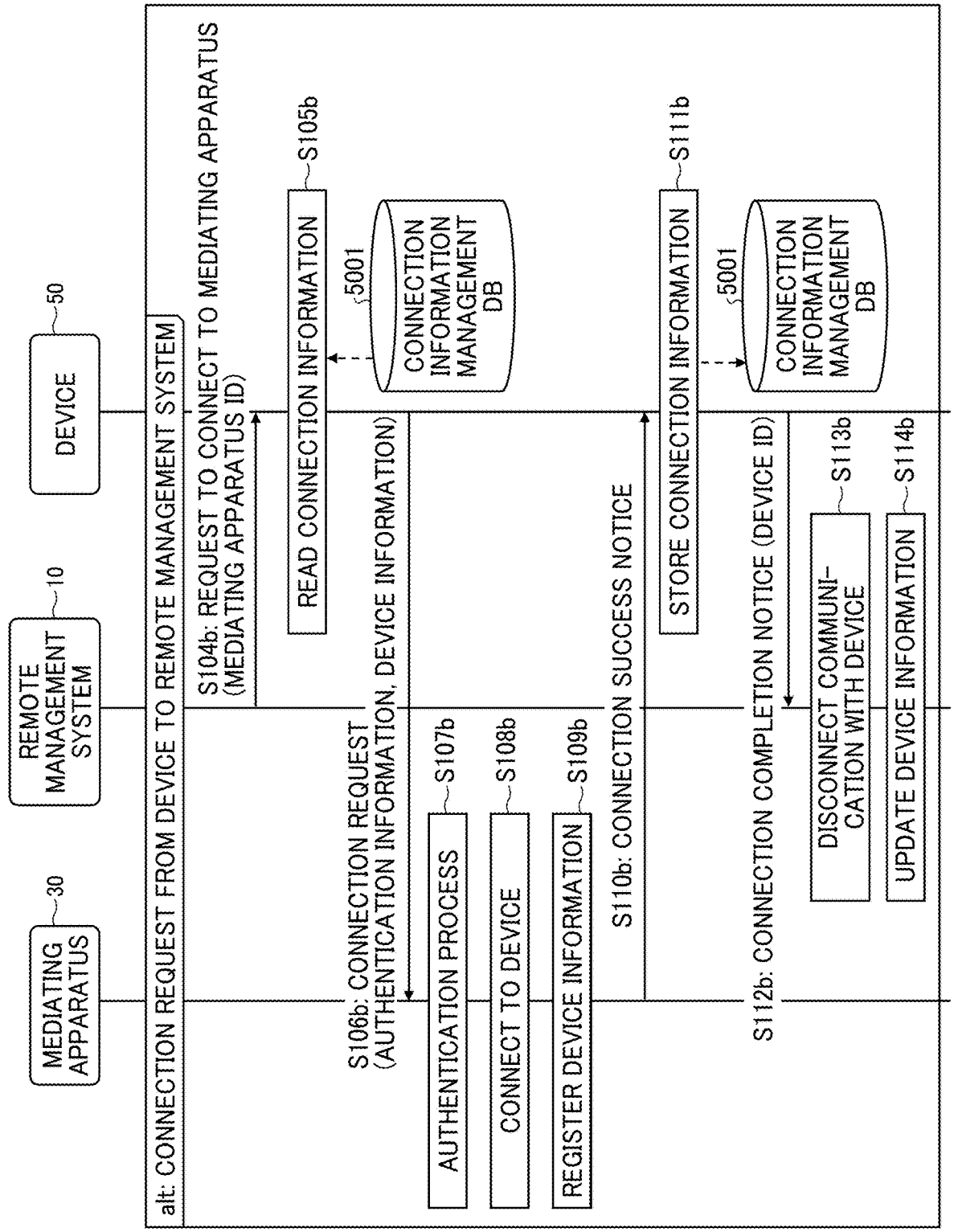
FIG. 22 is a sequence diagram illustrating another example of the process of connecting a device to a mediating apparatus in response to a restoration of the mediating apparatus in the device management system according to embodiments of the present disclosure.

With reference to FIGS. 20 to 22, a configuration in a case in which the remote management system 10 monitors life and death of the mediating apparatus 30 is described. In FIGS. 20 to 22, description is made assuming that the remote management system 10 stores the device information management table of FIG. 19 and the device 50 is holding both a communication path directly connected to the remote management system 10 and a communication path through the mediating apparatus 30. Further, FIGS. 20 to 22 are described assuming that the device 50 stores both the connection information of the mediating apparatus 30 and the connection information of the remote management system 10.

With reference to FIG. 20, a process when a malfunction occurs in the mediating apparatus 30 connected to the device 50 is described. FIG. 20 is a sequence diagram illustrating an example of a process of connecting the device to the remote management system in response to a detection of a malfunction in the mediating apparatus in the device management system according to the present embodiment.

In step S81, the status monitoring unit 22 of the remote management system 10 monitors life and death of the mediating apparatus 30. The status monitoring unit 22 periodically acquires status information indicating status of the mediating apparatus 30 from the mediating apparatus 30 to monitor whether the mediating apparatus 30 is operating normally. In step S82, the status monitoring unit 22 detects a malfunction in the mediating apparatus 30 based on the status information acquired from the mediating apparatus 30. The status monitoring unit 22 detects the malfunction in the mediating apparatus 30, for example, when the status information cannot be acquired from the mediating apparatus 30, or when the acquired status information indicates a sign of malfunction (failure) in the mediating apparatus 30. The sign of malfunction (failure) of the mediating apparatus 30 is detected, for example, when information indicating a state of failure such as WARN, ERROR, INFO, or DEBUG is included in the status information.

In step S83, the device information management unit 15 searches the device information management DB 1001 (refer to FIG. 19) using as a search key, the mediating apparatus ID of the mediating apparatus 30 detected as causing malfunction in step S82 and the device 50 connected to the mediating apparatus 30 causing malfunction is searched. In step S84, the device information management unit 15 reads the device information of the device 50 searched in step S83 from the device information management DB 1001 through the storing and reading unit 19.

In step S85, the device communication unit 12 transmits a connection request indicating that the device 50 searched in step S83 is requested to be connected to the remote management system 10. The connection request includes authentication information used for authentication between the remote management system 10 and the device 50. The authentication information is described as being generated in advance at the time of the first connection with the device 50. Accordingly, the network communication unit 51 of the device 50 receives the connection request transmitted from the remote management system 10.

In step S86, the authentication unit 55 of the device 50 executes the authentication process of the remote management system 10 using the authentication information received in step S85. The authentication unit 55 permits access by the remote management system 10 when the received authentication information matches the authentication information of the remote management system 10 stored in the connection information management DB 5001. When the access of the remote management system 10 is permitted, the device 50 executes subsequent processing.

In step S87, the connection control unit 58 executes a connection process for communication with the remote management system 10 authenticated in step S86. In this case, the connection control unit 58 disconnects the communication with the mediating apparatus 30. Further, the information management unit 57 updates the connection status with the remote management system 10 included in the connection information of the remote management system 10 stored in the connection information management DB 5001 to "connected". On the other hand, the information management unit 57 updates the connection status with the mediating apparatus 30 included in the connection information of the mediating apparatus 30 stored in the connection information management DB 5001 to "disconnected (not connected)". In step S88, the network communication unit 51 transmits a connection success notice indicating that the connection with the remote management system 10 has been successful to the remote management system 10. The connection success notice includes the device ID of the device 50. Accordingly, the device communication unit 12 of the remote management system 10 receives the connection success notice transmitted from the device 50.

In step S89, the device information management unit 15 updates the device information stored in the device information management DB 1001. The device information management unit 15 updates the usage status of the mediating apparatus associated with the device ID received in step S88 to "NO". Thereby, the remote management system 10 can manage the state in which the device 50 is directly connected to the remote management system 10 without going through the mediating apparatus 30.

In this way, the remote management system 10 monitors the life and death of the mediating apparatus 30 to which the device 50 is connected. When a malfunction occurs in the mediating apparatus 30, it is possible to automatically switch to a network configuration that directly connects to the device 50.

With reference to FIGS. 21 to 22, a process when the mediating apparatus 30 in which a malfunction is detected in the process of FIG. 20 restore normal state is described. FIGS. 21 and 22 are sequence diagrams illustrating an example of a process of connecting the device to the mediating apparatus in response to a restoration of the mediating apparatus in the device management system according to the present embodiment.

In step S101, the status monitoring unit 22 of the remote management system 10 periodically acquires the status information indicating the status of the mediating apparatus 30 from the mediating apparatus 30 to monitor the life and death of the mediating apparatus 30 as in step S81. In step S102, the status monitoring unit 22 detects restoration of the mediating apparatus 30 to a normal state based on the status information acquired from the mediating apparatus 30.

In step S103, the device information management unit 15 searches the device information management DB 1001 using as a search key, the mediating apparatus ID of the mediating apparatus 30 detected as restored to the normal state in step S102 and the device 50 connected to the mediating apparatus 30 restored to the normal state is searched.

Here, in the case of connecting the mediating apparatus 30 detected as restored to the normal state in step S102 to the device 50 searched in step S103, the subsequent processing is described separately for the case in which the connection request is made from the mediating apparatus 30 to the device 50 and the case in which the connection request is made from the device 50 to the mediating apparatus 30.

In step S104a, the connection control unit 17 of the remote management system 10 disconnects the communication with the device 50 searched in step S103. In step S105a, the mediating apparatus communication unit 11 transmits a connection request indicating that the mediating apparatus 30 detected as restored to the normal state in step S102 is requested to connect to the device 50 disconnected in step S104a. The connection request includes the device ID of the device 50 disconnected in step S104. Accordingly, the network communication unit 31 of the mediating apparatus 30 receives the connection request transmitted from the remote management system 10.

In step S106a, the device information management unit 37 of the mediating apparatus 30 searches the device information management DB 3001 (refer to FIG. 6A) using the device ID received in step S105a as a search key and reads the device information associated with the same device ID as the received device ID. In step S107a, the device communication unit 32 transmits a connection request indicating that the device 50 corresponding to the device information read in step S106a is requested to be connected to the mediating apparatus 30. The connection request includes authentication information used for authentication between the mediating apparatus 30 and the device 50. The authentication information is described as being stored in advance at the time of the first connection with the device 50. Accordingly, the mediating apparatus communication unit 52 of the device 50 receives the connection request transmitted from the mediating apparatus 30.

In step S108a, the authentication unit 55 of the device 50 executes authentication process of the mediating apparatus 30 using the authentication information received in step S107a. When the received authentication information and the authentication information of the mediating apparatus 30 stored in the connection information management DB 5001 match, the authentication unit 55 permits access by the mediating apparatus 30. In response to permitting the access of the mediating apparatus 30, the device 50 executes subsequent processing.

In step S109a, the connection control unit 58 executes a connection process for communication with the mediating apparatus 30 authenticated in step S108a. The information management unit 57 updates the connection status with the mediating apparatus 30 included in the connection information of the mediating apparatus 30 stored in the connection information management DB 5001 to "connected". On the other hand, the information management unit 57 updates the connection status with the remote management system 10 included in the connection information of the remote management system 10 stored in the connection information management DB 5001 to "disconnected (not connected)". In step S110a, the mediating apparatus communication unit 52 transmits a connection success notice indicating that the connection with the mediating apparatus 30 is successful to the mediating apparatus 30. The connection success notice includes the device information of the device 50. Accordingly, the device communication unit 32 of the mediating apparatus 30 receives the connection success notice transmitted from the device 50.

In step S111a, the device information management unit 37 of the mediating apparatus 30 stores the device information received in step S110a in the device information management DB 3001. In step S112a, the network communication unit 31 transmits a connection completion notice indicating that the connection with the device 50 is completed to the remote management system 10. The connection completion notice includes the device ID of the device 50 having device information registered in step S111a. Accordingly, the mediating apparatus communication unit 11 of the remote management system 10 receives the connection completion notice transmitted from the mediating apparatus 30.

In step S113a, the device information management unit 15 of the remote management system 10 updates the device information stored in the device information management DB 1001. The device information management unit 15 updates the usage status of the mediating apparatus associated with the device ID received in step S113a to "YES". Accordingly, the remote management system 10 can manage a state in which the device 50 is connected to the mediating apparatus 30, that is, a state in which the device 50 is registered under the control of the mediating apparatus 30.

With reference to FIG. 22, a process when a connection request is made from the device 50 to the mediating apparatus 30 is described. In step S104b, the device communication unit 12 of the remote management system 10 transmits to the device 50 searched in step S103, a connection request indicating that a connection with the mediating apparatus 30 detected as restored to the normal state in step S102 is requested. The connection request includes a mediating apparatus ID of the mediating apparatus 30 detected as restored to the normal state in step S102. Accordingly, the network communication unit 51 of the device 50 receives the connection request transmitted from the remote management system 10.

In step S105b, the information management unit 57 of the device 50 searches the connection information management DB 5001 (refer to FIG. 7) using the mediating apparatus ID received in step S104b as a search key and reads the connection information associated with the same mediating apparatus ID as the received mediating apparatus ID. In step S106b, the mediating apparatus communication unit 52 transmits a connection request indicating that the connection with the device 50 is requested to the mediating apparatus 30 corresponding to the connection information read in step S105b. The connection request includes the authentication information included in the connection information read in step S105b and the device information of the device 50. Accordingly, the device communication unit 32 of the mediating apparatus 30 receives the connection request transmitted from the device 50.

In step S107b, the authentication unit 35 of the mediating apparatus 30 executes an authentication process of the device 50 using the authentication information received in step S106b. The authentication unit 35 permits access to the device 50 when the received authentication information matches the authentication information stored in the authentication unit 35. In response to permitting the access of the device 50, the mediating apparatus 30 executes subsequent processing.

In step S108b, the connection control unit 41 executes a connection process for communication with the device 50 authenticated in step S107b. In step S109b, the device information management unit 37 stores the device information received in step S106b in the device information management DB 3001. In step S110b, the device communication unit 32 transmits a connection success notice indicating that the connection with the device 50 is successful to the device 50. Accordingly, the mediating apparatus communication unit 52 of the device 50 receives the connection success notice transmitted from the mediating apparatus 30.

In step S111b, the information management unit 57 of the device 50 updates the connection information stored in the connection information management DB 5001. The information management unit 57 updates the connection status with the mediating apparatus 30 included in the connection information of the mediating apparatus 30 stored in the connection information management DB 5001 to "connected". On the other hand, the information management unit 57 updates the connection status with the remote management system 10 included in the connection information of the remote management system 10 stored in the connection information management DB 5001 to "disconnected (not connected)". In step S112b, the network communication unit 51 transmits to the remote management system 10, a connection completion notice indicating that the connection with the mediating apparatus 30 is completed. The connection completion notice includes the device ID of the device 50. Accordingly, the mediating apparatus communication unit 11 of the remote management system 10 receives the connection completion notice transmitted from the device 50.

In step S113b, the connection control unit 17 of the remote management system 10 disconnects the communication with the device 50 that transmitted the connection completion notice in step S112b. In step S114b, the device information management unit 15 updates the device information stored in the device information management DB 1001. The device information management unit 15 updates the usage status of the mediating apparatus associated with the device ID received in step S112b to "YES". Accordingly, the remote management system 10 can manage a state in which the device 50 is connected to the mediating apparatus 30, that is, a state in which the device 50 is registered under the control of the mediating apparatus 30.

As described above, in the device management system 1, when a malfunction occurs in the mediating apparatus 30, the remote management system 10 and the device 50 are directly connected to each other, and when the mediating apparatus 30 returns to a normal state, the network configuration is automatically switched so that the mediating apparatus 30 and the device 50 are reconnected. The device management system 1 directly connects the device 50 and the remote management system 10 only when a malfunction occurs in the mediating apparatus 30, without making the device administrator aware of the connection switching, the availability of the system can be improved while reducing the security risk by using communication through the mediating apparatus 30 during normal operation.

Figure 23:
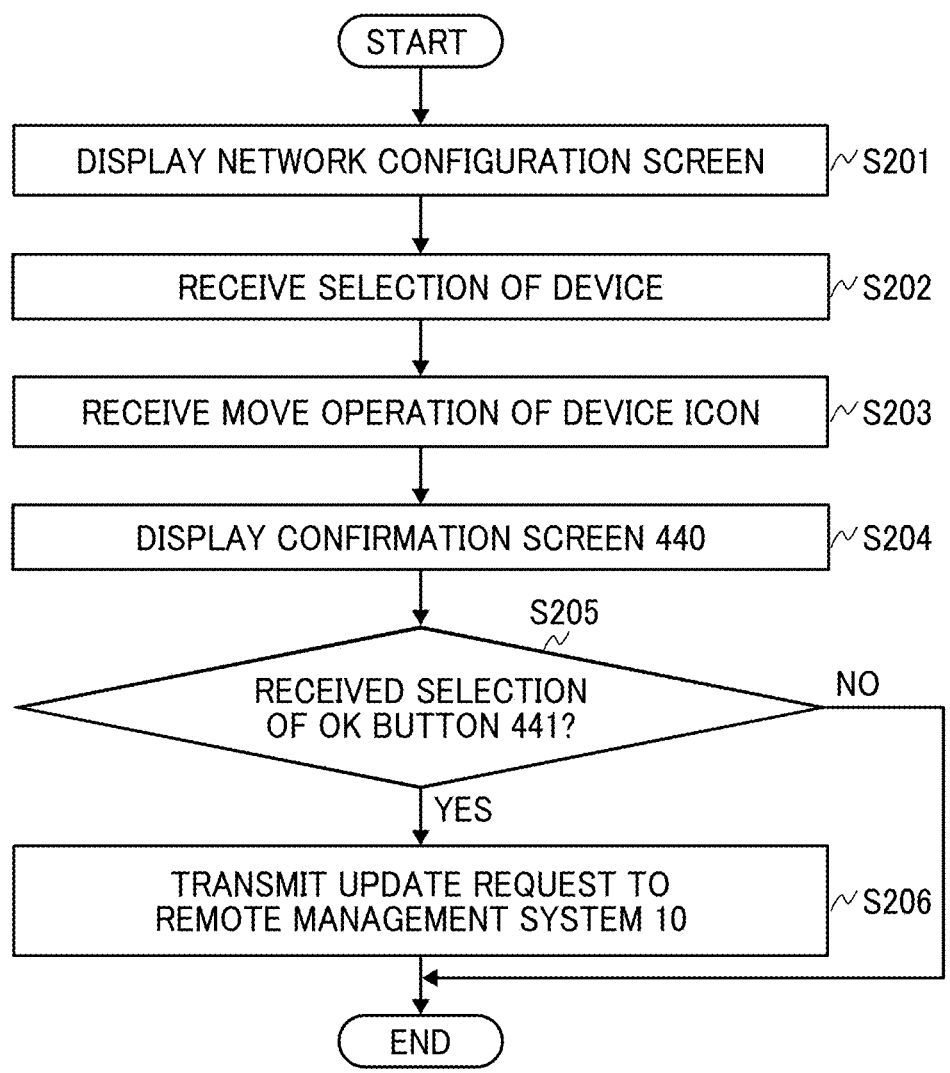
FIG. 23 is a flowchart illustrating an example of a network configuration update process in the device management system according to embodiments of the present disclosure.

With reference to FIGS. 23 to 25B, the update processing of the network configuration of various devices and devices included in the device management system 1 is described. FIG. 23 is a flowchart illustrating an example of a network configuration update process in the device management system according to the present embodiment. Note that FIG. 23 illustrates an example in which the device administrator performs processing using the administrator terminal 90, but the same applies even when the device administrator performs processing using the mediating apparatus 30.

Figure 24A:
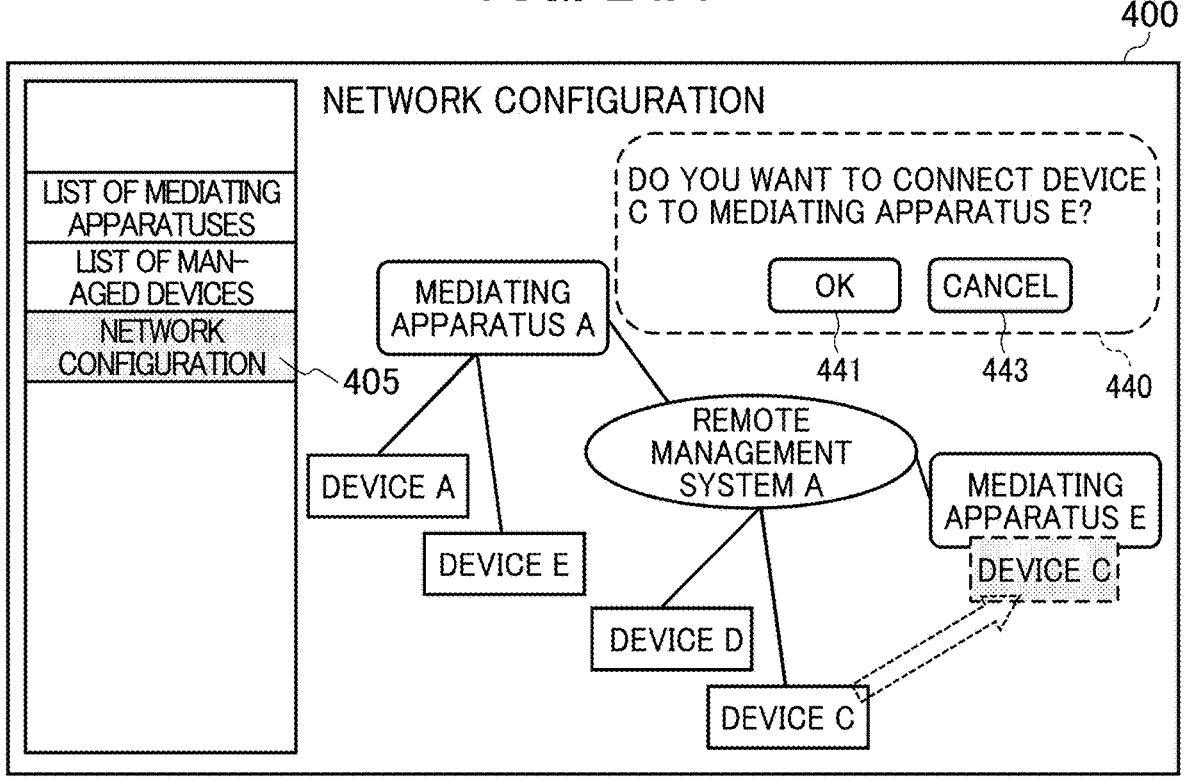
FIGS. 24A and 24B are diagrams illustrating examples of a network configuration display screen displayed on the administrator terminal according to embodiments of the present disclosure.

In step S201, the display control unit 93 of the administrator terminal 90 causes the display 106 to display a network configuration display screen presenting a network configuration diagram that visualizes the communication connection status of the device 50. The network configuration display screen 400 illustrated in FIG. 24A is displayed, for example, by selecting the "network configuration" button 405 illustrated in FIG. 24A while the connection status display screen illustrated in FIG. 12A or FIG. 12B is displayed. The network configuration display screen 400 visualizes network topology of the device management system 1. The device administrator can intuitively grasp the network configuration by checking the network configuration display screen 400.

Figure 24B:
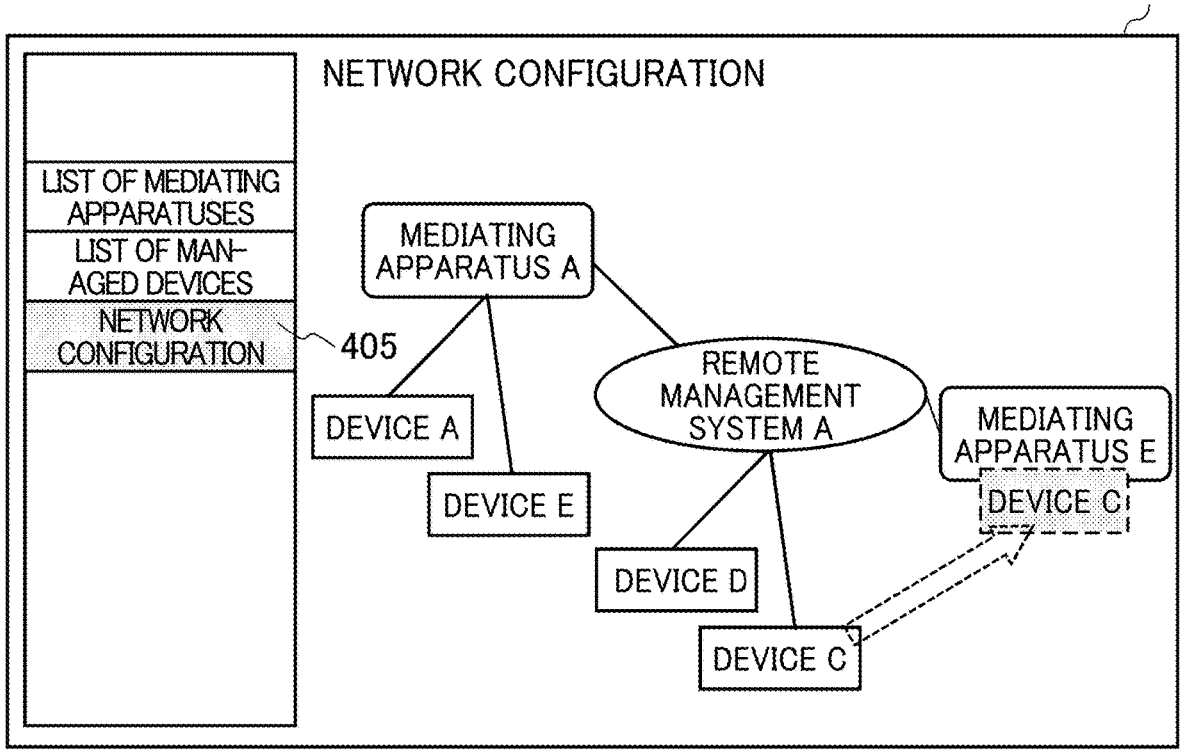

In step S202, the device administrator selects a device icon displayed on the network configuration display screen 400, and the reception unit 92 accepts the selection of the device 50. In step S203, the reception unit 92 receives an operation of moving the device icon on the network configuration display screen 400, as illustrated in FIG. 24B. Specifically, the reception unit 92 accepts the operation of moving the device icon by performing a drag-and-drop operation on the network configuration display screen 400 for the device icon selected by the device administrator. For example, the device administrator drags the selected device icon and drops the device icon at the position on the screen of the mediating apparatus 30 to be connected to the device 50. In the example of FIG. 24B, the reception unit 92 receives the operation to move the icon of the device C to a vicinity of the mediating apparatus E on the network configuration display screen 400.

Figure 25A:
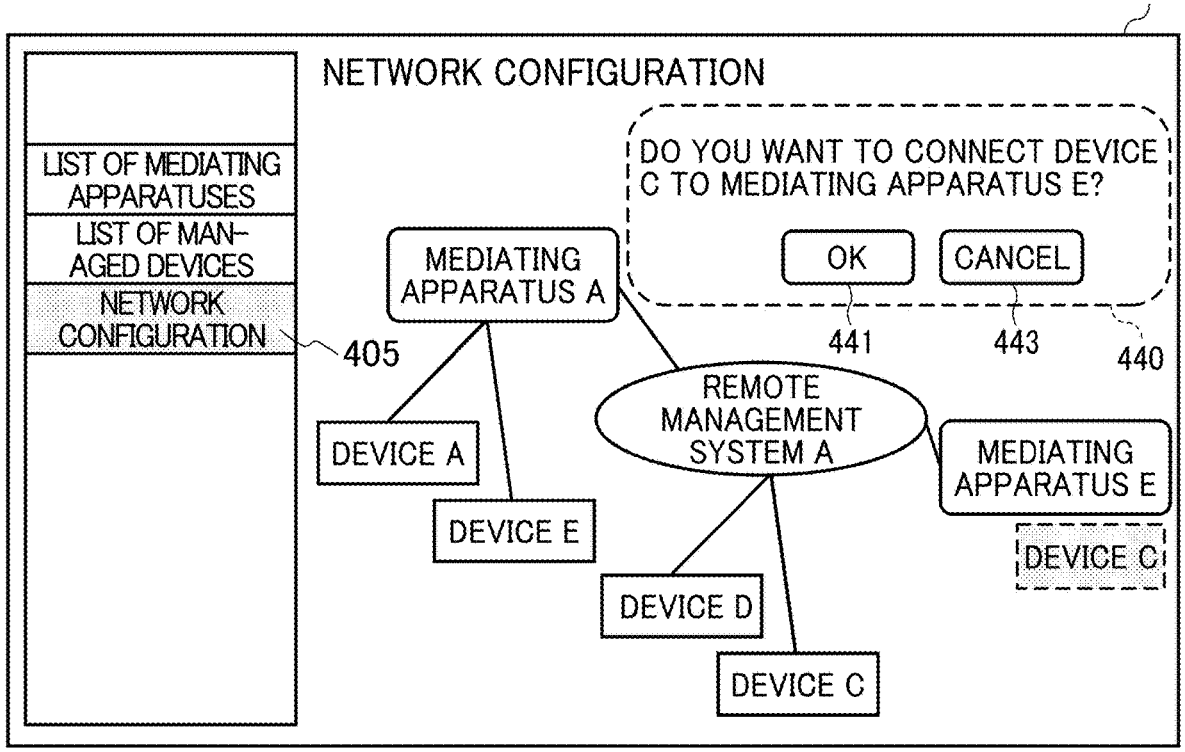
FIGS. 25A and 25B are diagrams illustrating examples of the network configuration display screen displayed on the administrator terminal according to embodiments of the present disclosure.

In step S204, the display control unit 93 displays a confirmation image 440 for selecting whether the network configuration can be changed corresponding to the movement operation received in step S203 on the network configuration display screen 400. The confirmation image 440 illustrated in FIG. 25A is for selecting whether to change the configuration in which the device C is connected to the mediating apparatus E, and includes an "OK" button 441 to be pressed when permitting a configuration change and a "cancel" button 443 to be pressed when canceling the configuration change.

In response to receiving the selection of the "OK" button 441 included in the confirmation image 440 (YES in step S205), the reception unit 92 shifts the process to step S206. On the other hand, in response to receiving the selection of the "cancel" button 443 included in the confirmation image 440 (NO in step S205), the reception unit 92 ends the process without updating the network configuration.

Figure 25B:
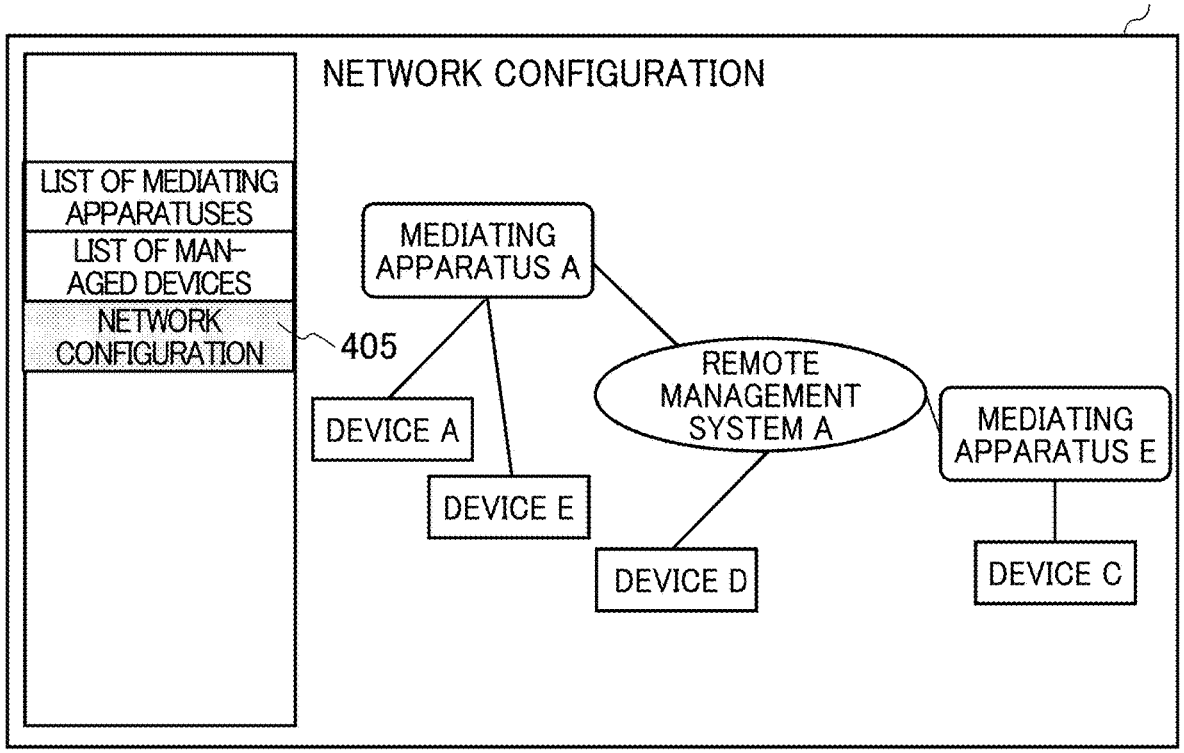

In step S206, the communication unit 91 transmits an update request indicating that an update to the network configuration corresponding to the operation to move the icon received in step S203 is requested to the remote management system 10. This update request includes the device ID of the device 50 selected in step S202, and the mediating apparatus ID of the mediating apparatus 30 from which the device icon was dropped in step S203. Accordingly, the terminal communication unit 21 of the remote management system 10 receives the update request transmitted from the administrator terminal 90. Then, the remote management system 10 executes a process for connecting the device 50 to the new mediating apparatus 30 and switches the connection status of the device 50 in the same manner as the above-described process. The network configuration display screen 450 illustrated in FIG. 25B indicates a state in which the network configuration has been changed through the process illustrated in FIG. 23. As illustrated in FIG. 25B, the network configuration of the device management system 1 is changed to a configuration in which the device C directly connected to the remote management system 10 is connected to the mediating apparatus E.

As described above, the device management system 1 displays the network configuration display screen 400 presenting the network configuration diagram in which the communication connection status of the device 50 is visualized and the connection status of the device 50 can be changed by a drag-and-drop operation on the screen by the device administrator. As a result, the device administrator can intuitively manage or change the network configuration by using the network configuration display screen.

As described above, the remote management system 10 switches the connection settings between the remote management system 10 and the mediating apparatus 30 and the device 50 according to the operation of the device administrator using the connection status display screen or the network configuration display screen. Conventionally, when installing a new mediating apparatus while the communication between the remote management system and the device is connected, because it is necessary to disconnect the communication between the remote management system and the device and connect the communication between the mediating apparatus and the device separately, it took a lot of time and effort to set the connection for communication with the device 50. In the device management system 1 by using a device management user interface that registers the device 50 directly connected to the remote management system to under the control of the mediating apparatus 30 and changes the network configuration, the setting work that required a plurality of steps for each of the remote management system 10 and the mediating apparatus 30 can be simplified.

As described above, the device management system according to the embodiments of the present disclosure includes the remote management system 10 that manages the device 50 residing in the local network 7 and the mediating apparatus 30 that mediates communication between the device 50 and the device management system 1 and displays on the display 106, the connection status display screen presenting a communication connection status of the device 50. The device management system 1 receives a selection of the device 50 to be connected to the mediating apparatus 30 from the devices 50 displayed on the connection status display screen, and transmits to the remote management system 10, the registration request of the selected device 50 in the mediating apparatus 30. The device management system 1 disconnects the communication between the remote management system 10 and the device 50 and connects the communication between the mediating apparatus 30 and the device 50 in response to the registration request transmitted to the remote management system 10. Thereby, the device management system 1 can set a communication connection for connecting the device 50 directly connected to the remote management system 10 to the mediating apparatus 30 by a simpler method.

Further, the device management system 1 according to the embodiments of the present disclosure receives device information related to the device 50 stored by the remote management system from the remote management system 10, and a connection status display screen including the received device information is displayed on a display 106. As a result, the device management system 1 can select a device 50 to be connected to the mediating apparatus 30 from one or more devices 50 registered in the remote management system 10, it is possible to change the network configuration for switching the communication connection so that the device 50 directly connected to the remote management system 10 is connected to the mediating apparatus 30.

Further, the device management system 1 according to the embodiments of the present disclosure includes the remote management system 10. The remote management system 10 receives a registration request transmitted from the mediating apparatus 30 and disconnects the communication with the device 50 in response to the received registration request. Further, the remote management system 10 receives a registration cancellation request indicating cancellation of registration of the device 50 in the mediating apparatus 30, and in response to the received registration cancellation request, connects the communication with the device 50 disconnected from the mediating apparatus 30. As a result, the device management system 1 can select an optimum network configuration according to the situation. For example, the device management system 1 may perform communication through the mediating apparatus 30 normally and when it is necessary to place more importance on real-time communication, may switch to a configuration that does not involve the mediating apparatus 30.

Further, in the device management system 1 according to the embodiments of the present disclosure, the remote management system 10 stores connection destination information indicating a connection destination of the device 50. When the mediating apparatus 30 and the device 50 are connected, the remote management system 10 stores the mediating apparatus 30 as a connection destination, and when the remote management system 10 and the device 50 are connected, the remote management system 10 stores the remote management system 10 as the connection destination. Further, the remote management system 10 stores usage status of the mediating apparatus 30 as the connection destination information. As a result, the device management system 1 secures a plurality of communication paths so that the remote management system 10 can directly connect to the device 50 only when a malfunction occurs in the mediating apparatus 30 and communication cannot be performed. Accordingly, availability of the system can be improved.

Further, in the device management system 1 according to the embodiments of the present disclosure, a network configuration display screen presents communication connection status of the device 50 as a network configuration diagram. The device management system 1 receives a movement operation of the device 50 on the network configuration display screen and updates the connection status of the device 50 according to the received movement operation. As a result, the device management system 1 allows the device administrator to more intuitively manage or change the network configuration by using the network configuration display screen.

Further, in the device management system 1 according to the embodiment of the present disclosure, the remote management system 10 detects status of the mediating apparatus 30. In response to detection of a malfunction in the mediating apparatus 30, the device management system 1 disconnects the communication between the mediating apparatus 30 and the device 50 and connects the communication between the remote management system 10 and the device 50. Further, in response to detection of a restoration of the mediating apparatus 30, the device management system 1 disconnects the communication between the remote management system 10 and the device 50 and connects the communication between the mediating apparatus 30 and the device 50. The device management system 1 directly connects the device 50 and the remote management system 10 only when a malfunction occurs in the mediating apparatus 30, without making the device administrator aware of the connection switching, the availability of the system can be improved while reducing the security risk by using communication through the mediating apparatus 30 during normal operation.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

Various tables of the embodiments described above may be generated by learning effect of machine learning, and by classifying the data of each related item by machine learning, the tables may not be used. Here, the machine learning is a technology for making a computer acquire learning ability like a human being and the computer autonomously generates an algorithm required for determination such as data identification from learning data loaded in advance and applies the generated algorithm to new data to make a prediction. Any suitable learning method is applied for machine learning, for example, any one of supervised learning, unsupervised learning, semi-supervised learning, reinforcement learning, and deep learning, or a combination of two or more of these learning.

Although the remote management system, device management method, and program according to the embodiments of the present disclosure have been described above, the present disclosure can be modified within the scope of those skilled in the art, such as other embodiments, additions, modifications, deletions, etc., and as long as effects of the present disclosure are exhibited in any of the embodiments, the embodiments are included in the scope of the present disclosure.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. A mediating apparatus for mediating communication between one or more devices residing in a local network and a remote management system configured to manage the one or more devices,
the mediating apparatus including circuitry configured to:
display on a display, a screen presenting communication connection status of the communication of the one or more devices;
receive selection of a device to be registered in the mediating apparatus, among the one or more devices displayed on the screen presenting the communication connection status;
receive a registration request to register the device in the mediating apparatus; and
in response to the registration request, transmit, to the device, a connection request indicating a request to connect to the mediating apparatus, the connection request including authentication information, connect communication between the mediating apparatus and the device after the authentication information is authenticated by the device, and receive a connection success notice transmitted from the device, after disconnection of communication between the remote management system and the device.

2. The mediating apparatus of claim 1, wherein the circuitry is further configured to:
receive from the remote management system, device information related to the device registered in the remote management system; and
display on the display, the screen presenting the communication connection status including the device information related to the device.

3. The mediating apparatus of claim 2, wherein the circuitry is further configured to:
display on the display, an initial setting screen for connecting to the remote management system;
receive an input of system information for identifying the remote management system;
transmit the system information to the remote management system; and
receive the device information from the remote management system authenticated using the system information.

4. A device management system comprising:
the mediating apparatus of claim 1; and
a remote management system including:
circuitry configured to:
receive the registration request transmitted from the mediating apparatus; and
disconnect the communication with the device in response to the received registration request.

5. The device management system of claim 4, wherein the circuitry of the remote management system is further configured to:
receive a registration cancellation request for cancelling registration of the device in the mediating apparatus; and
in response to the received registration cancellation request, connect the communication with the device disconnected from the mediating apparatus.

6. The device management system of claim 4, wherein the circuitry of the remote management system is further configured to:
register connection destination information indicating a connection destination of the device,
wherein the circuitry registers the mediating apparatus as the connection destination when the mediating apparatus and the device are connected, and
registers the remote management system as the connection destination when the remote management system and the device are connected.

7. The device management system of claim 6, wherein the circuitry of the remote management system is further configured to register usage status of the mediating apparatus in the connection destination information.

8. The device management system of claim 4, wherein the circuitry of the remote management system is further configured to:
display on the display, a screen presenting the communication connection status of the one or more devices as a network configuration diagram;
receive an operation to move the one or more devices on the screen; and
update the communication connection status of the one or more devices in response to the received operation to move the one or more devices on the screen.

9. The device management system of claim 4, wherein the circuitry of the remote management system is further configured to:
detect status of the mediating apparatus; and
in response to detection of a malfunction of the mediating apparatus, disconnect the communication between the mediating apparatus and the device and connect the communication between the remote management system and the device.

10. The device management system of claim 9, wherein the circuitry of the remote management system is further configured to in response to detection of a restoration of the mediating apparatus, disconnect the communication between the remote management system and the device and connect the communication between the mediating apparatus and the device.

11. A method for controlling communication between one or more devices residing in a local network and a remote management system configured to manage the one or more devices, performed by a mediating apparatus, the method including:
displaying on a display, a screen presenting communication connection status of the communication of the one or more devices;
receiving selection of a device to be registered in the mediating apparatus, among the one or more devices presented on the screen;
receiving a registration request to register the device in the mediating apparatus; and
in response to the registration request, transmitting, to the device, a connection request indicating a request to connect to the mediating apparatus, the connection request including authentication information, connecting communication between the mediating apparatus and the device after the authentication information is authenticated by the device and receiving a connection success notice transmitted from the device, after disconnection of communication between the remote management system and the device.

12. A non-transitory recording medium which, when executed by one or more processors, cause the processors to perform a method for controlling, by a mediating apparatus, communication of one or more devices residing in a local network and a remote management system configured to manage the one or more devices, the method comprising:
displaying on a display, a screen presenting communication connection status of the communication of one or more devices;
receiving selection of a device to be registered in a mediating apparatus, among the one or more devices presented on the screen;
receiving a registration request to register the device in the mediating apparatus; and
in response to the registration request, transmitting, to the device, a connection request indicating a request to connect to the mediating apparatus, the connection request including authentication information, connecting communication between the mediating apparatus and the device after the authentication information is authenticated by the device and receiving a connection success notice transmitted from the device, after disconnection of communication between the remote management system and the device.

* * * * *